(12) United States Patent
Iida

(10) Patent No.: US 9,950,515 B2
(45) Date of Patent: Apr. 24, 2018

(54) INFORMATION PROCESSING DEVICE, IMAGE PRINTING APPARATUS, AND INFORMATION PROCESSING METHOD

(71) Applicant: Konica Minolta, Inc., Tokyo (JP)

(72) Inventor: Masaru Iida, Kawasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/527,385

(22) PCT Filed: Nov. 11, 2015

(86) PCT No.: PCT/JP2015/081700
§ 371 (c)(1),
(2) Date: May 17, 2017

(87) PCT Pub. No.: WO2016/093008
PCT Pub. Date: Jun. 16, 2016

(65) Prior Publication Data
US 2017/0334192 A1 Nov. 23, 2017

(30) Foreign Application Priority Data

Dec. 8, 2014 (JP) .................................. 2014-247973

(51) Int. Cl.
*B41J 2/045* (2006.01)
*B41J 19/14* (2006.01)
*B41J 2/21* (2006.01)

(52) U.S. Cl.
CPC ....... *B41J 2/04505* (2013.01); *B41J 2/04573* (2013.01); *B41J 19/145* (2013.01);
(Continued)

(58) Field of Classification Search
CPC .. B41J 2/04505; B41J 19/145; B41J 2/04573; B41J 2/2135; G03G 2215/00599; G03G 2215/00561
See application file for complete search history.

(56) References Cited

U.S. PATENT DOCUMENTS

2009/0085952 A1* 4/2009 Yamazaki .............. B41J 2/2142
347/19

FOREIGN PATENT DOCUMENTS

JP    2005035083 A    2/2005

OTHER PUBLICATIONS

The International Preliminary Report on Patentability and the Written Opinion from corresponding International Application No. PCT/JP2015/081700 and English translation.
(Continued)

*Primary Examiner* — Yaovi M Ameh
(74) *Attorney, Agent, or Firm* — Lucas & Mercanti, LLP

(57) ABSTRACT

An information processing device performs processing of specifying a positional relationship between a first printing section and a second printing section based on image capturing data of a test image that is printed on a printing medium by the first printing section and the second printing section in each of which a plurality of printing elements are arranged. The test image includes a plurality of first lines which are printed by the first printing section so as to have printing positions different from each other in a line arrangement direction on the printing medium and a plurality of second lines which are printed by the second printing section so as to have printing positions different from each other in the line arrangement direction. The information processing device contains a printing coordinate acquisition section, a printing position acquisition section, and a positional shift amount calculation section.

18 Claims, 19 Drawing Sheets

(52) U.S. Cl.
CPC ... *B41J 2/2135* (2013.01); *G03G 2215/00561* (2013.01); *G03G 2215/00599* (2013.01)

(56) References Cited

OTHER PUBLICATIONS

International Search Report dated Feb. 2, 2016 for PCT/JP2015/081700 and English translation.

\* cited by examiner

FIG.5
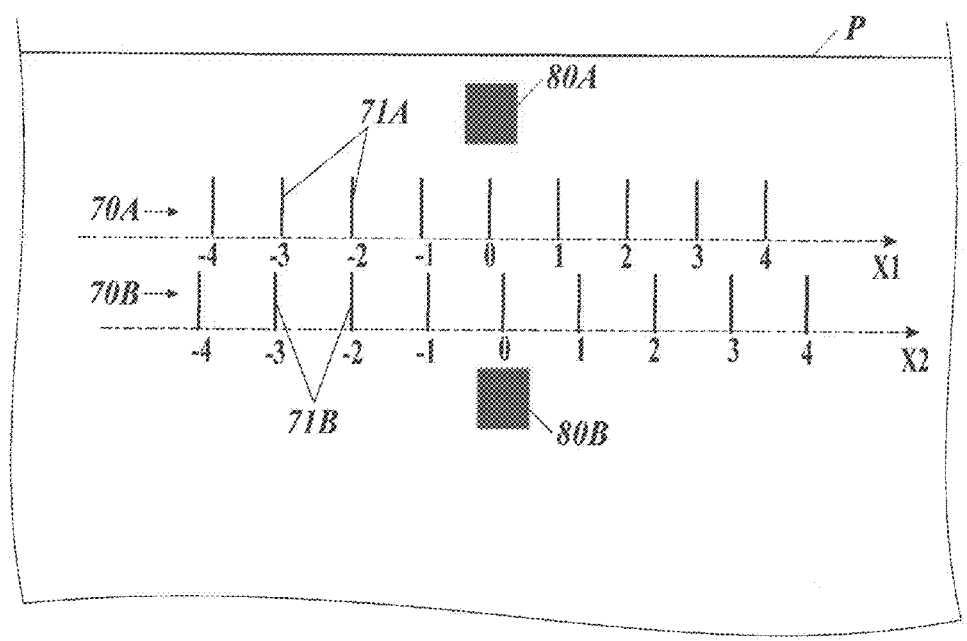
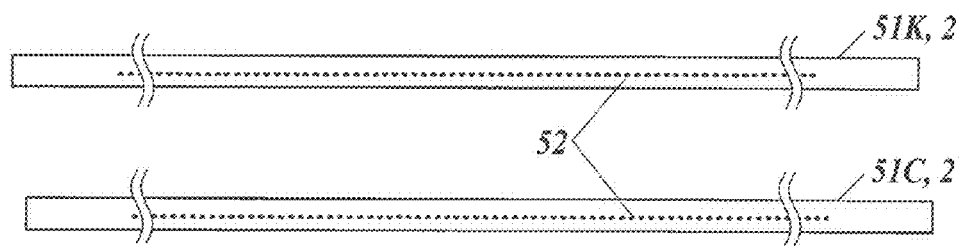
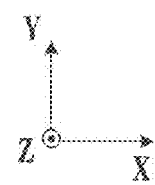

FIG. 7
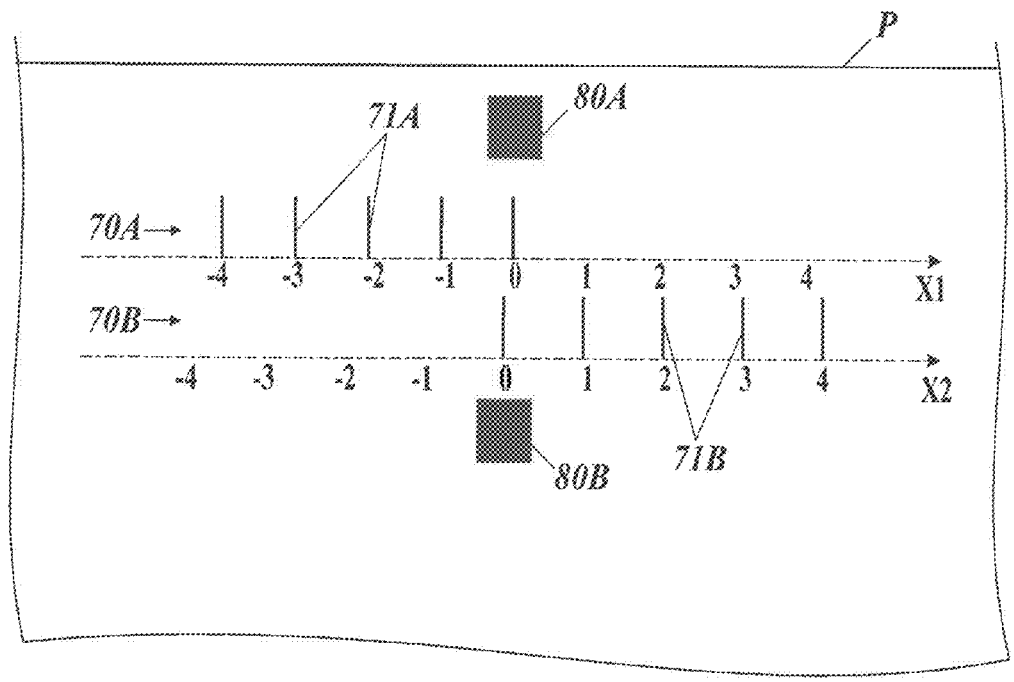
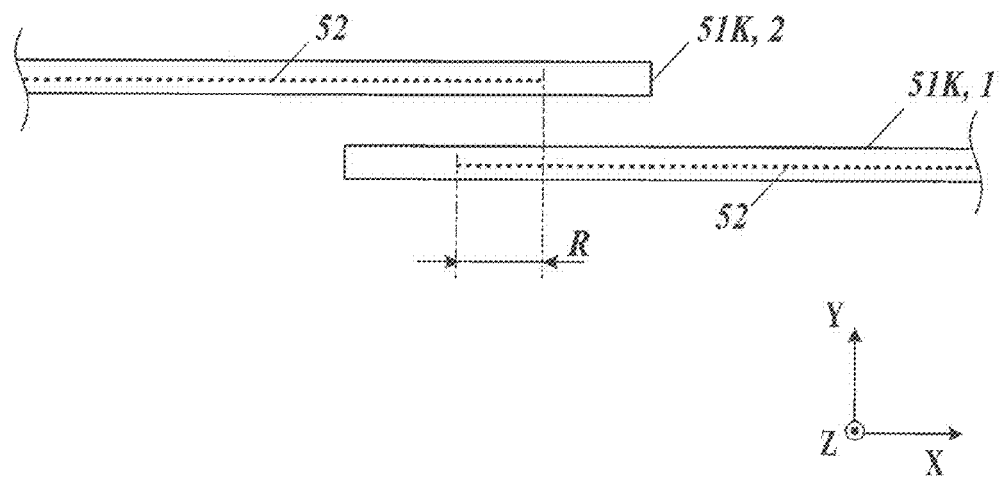

FIG.9
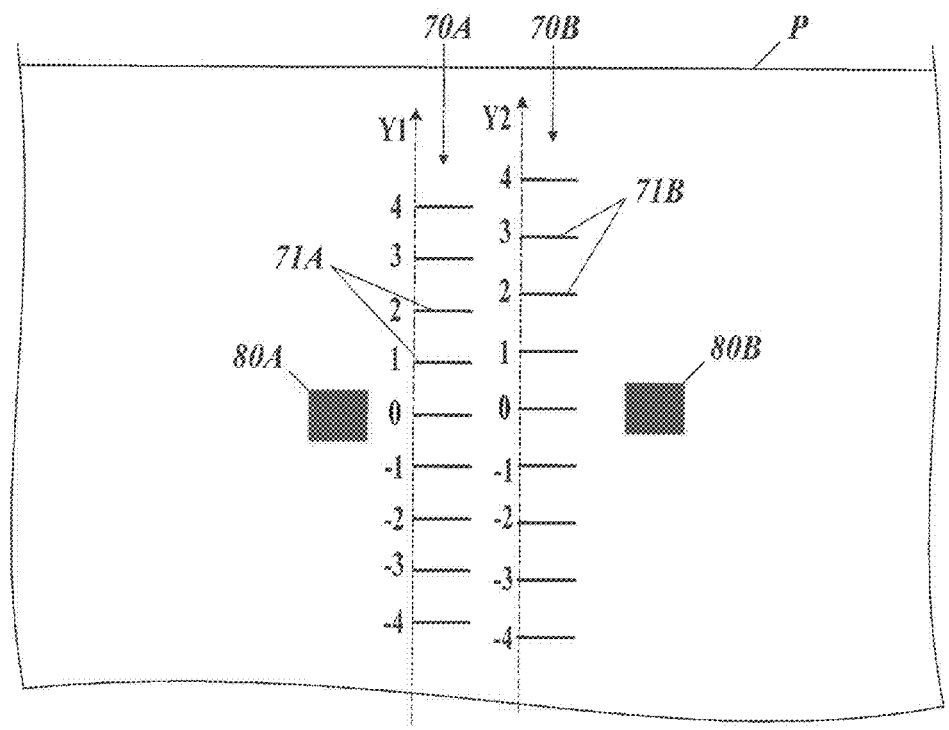
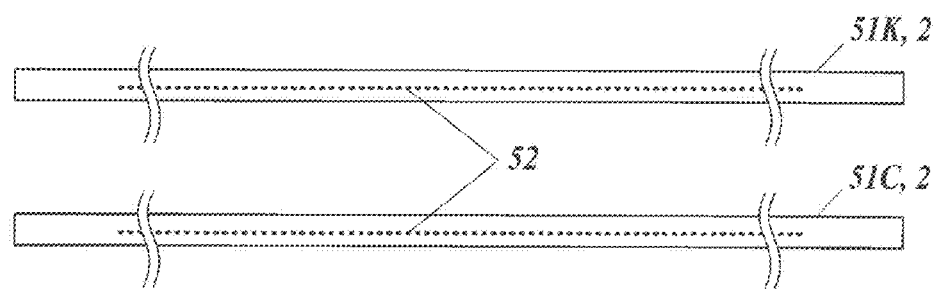
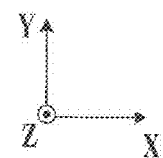

FIG.11
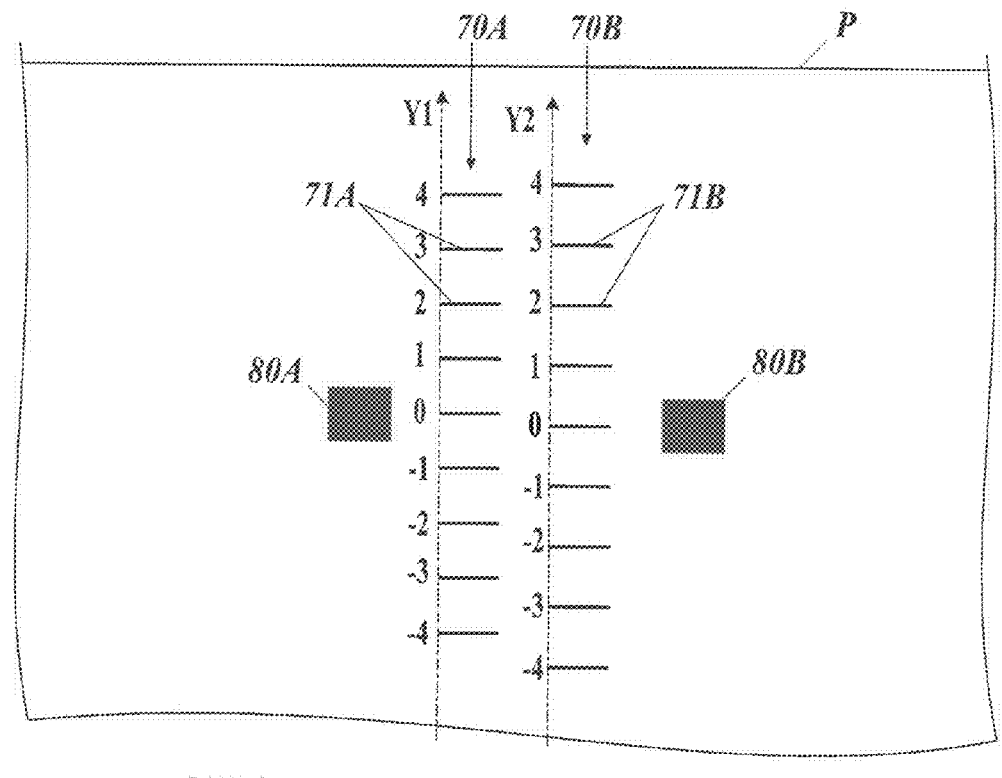
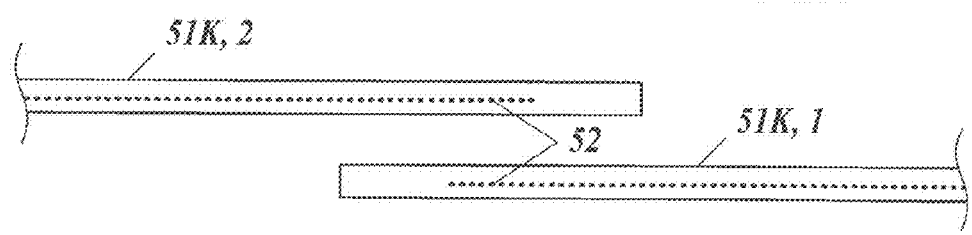
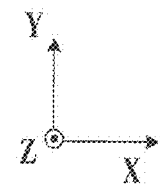

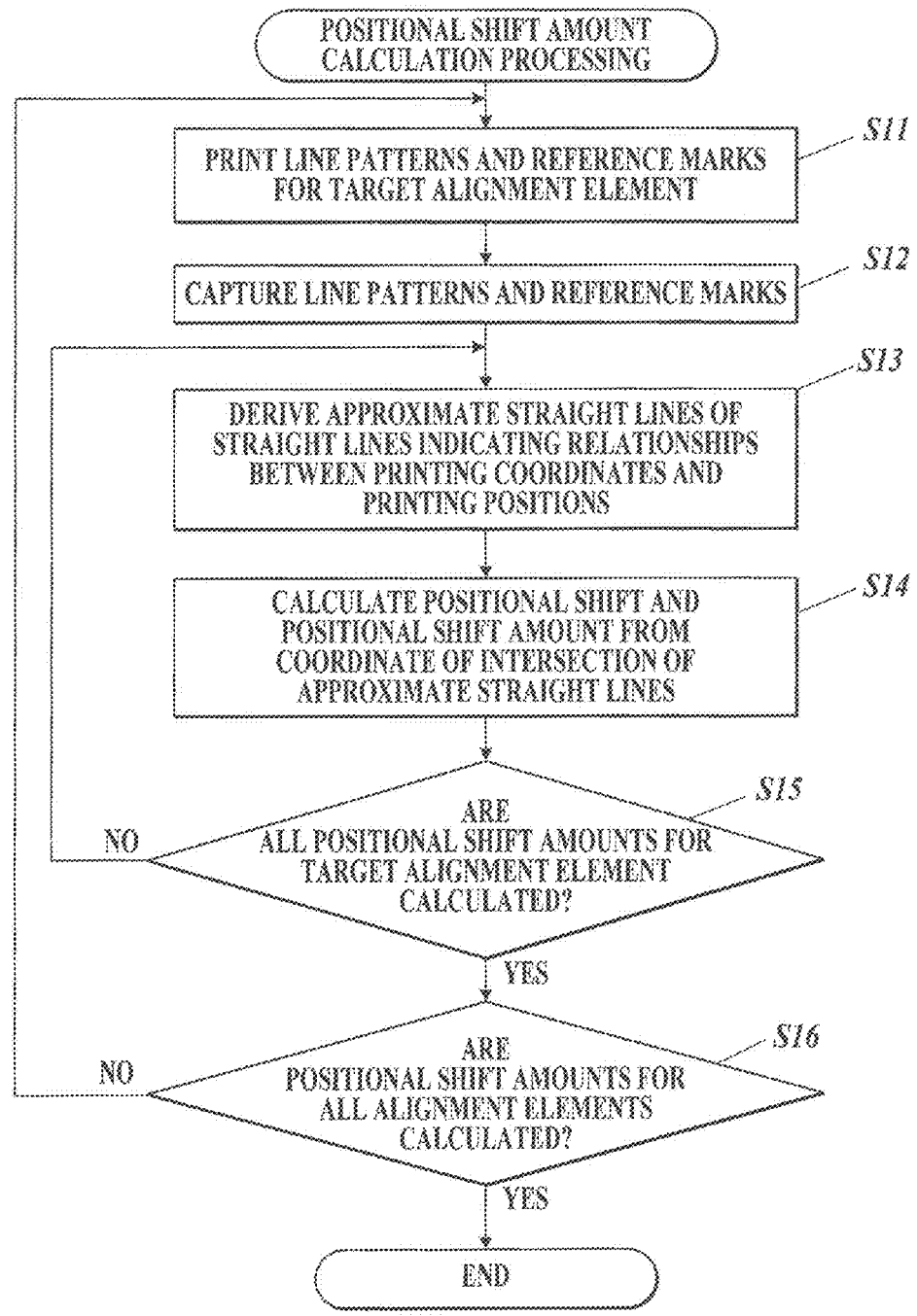

FIG.19
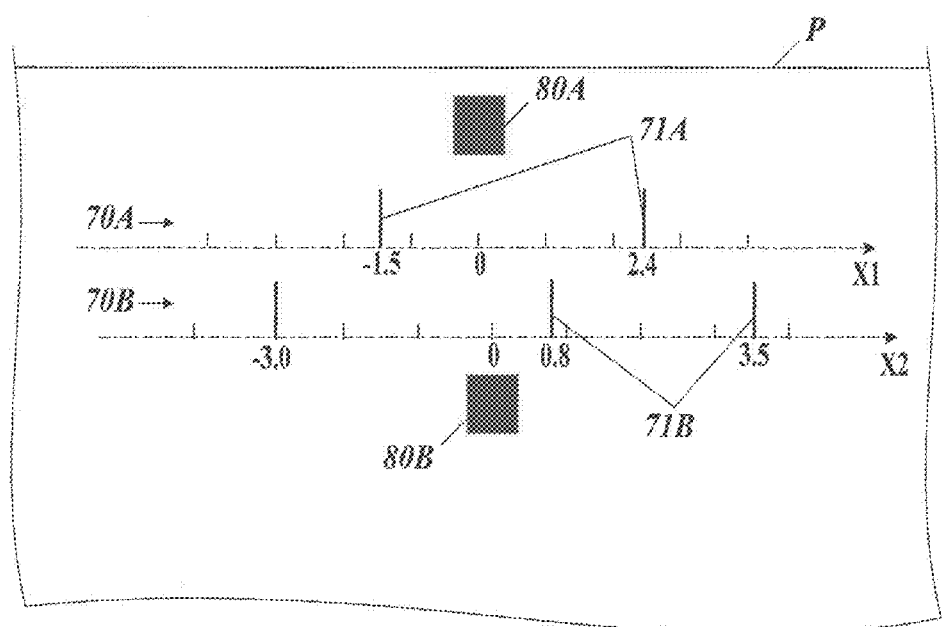
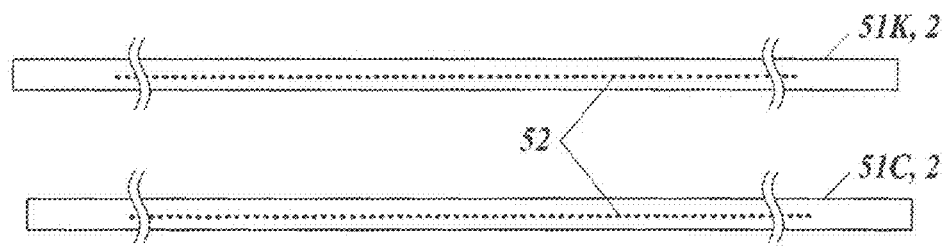

INFORMATION PROCESSING DEVICE, IMAGE PRINTING APPARATUS, AND INFORMATION PROCESSING METHOD

CROSS REFERENCE TO RELATED APPLICATION

This Application is a 371 of PCT/JP2015/081700 filed on Nov. 11, 2015, which, in turn, claimed the priority of Japanese Patent Application No. 2014-247973 filed on Dec. 8, 2014, both applications are incorporated herein by reference.

TECHNICAL FIELD

The present invention relates to an information processing device, an image printing apparatus and an information processing method.

BACKGROUND ART

There have been conventionally known image printing apparatuses each of which ejects ink from a plurality of nozzles provided in a print head and prints an image on a printing medium conveyed by a conveyance device. Such image printing apparatuses include an apparatus of a single-pass system which is provided with a plurality of print heads, covers the entire printing width in a width direction orthogonal to a predetermined conveyance direction of a printing medium conveyed in the conveyance direction with the entire row of nozzles included in the plurality of print heads, and thus performs image formation without causing the print heads to scan in the width direction.

In an image printing apparatus configured in such a way, a positional shift from an appropriate position of a print head is detected by printing a line pattern including a line printed by ink ejection from an individual nozzle of each of the print heads on a printing medium and reading the position in the width direction of the line pattern with a line sensor provided downstream in the conveyance direction (for example, Patent Document 1).

PRIOR ART DOCUMENT

Patent Document

Patent Document 1: Japanese Patent Application Laid Open Publication No. 2005-35083

DISCLOSURE OF THE INVENTION

Problems to be Solved by the Invention

However, in the conventional method, there has been a problem that, in order to detect a minute positional shift of a print head, a line sensor with a high resolution capable of detecting a positional shift of the line pattern of the same quantity as the positional shift of the print head is required. There has also been a problem that, in order to acquire the quantity of the minute positional shift of the line pattern with high accuracy, it is necessary to adjust the arrangement of the optical system and the image capturing elements of the line sensor with high accuracy so as to calibrate the resolution of the line sensor and control the relative position between the line sensor and the printing medium at the time of image capturing.

An object of the present invention is to provide an information processing device, an image printing apparatus and an information processing method capable of detecting a positional shift of a print head easily and with high accuracy.

Means for Solving the Problem

In order to achieve the above object, the invention of the information processing device according to claim 1 is characterized in an information processing device which performs processing of specifying a positional relationship between a first printing section and a second printing section based on image capturing data of a test image that is printed on a printing medium by the first printing section and the second printing section in each of which a plurality of printing elements are arranged, the test image including a plurality of first lines which are printed by the first printing section so as to have printing positions different from each other in a line arrangement direction on the printing medium and a plurality of second lines which are printed by the second printing section so as to have printing positions different from each other in the line arrangement direction, and the information processing device including: a printing coordinate acquisition section which acquires a printing coordinate on a first coordinate axis on the printing medium for each of the plurality of first lines and acquires a printing coordinate on a second coordinate axis for each of the plurality of second lines, the first coordinate axis being an axis in which a predetermined first unit coordinate interval is determined in the line arrangement direction, and the second coordinate axis being an axis in which a second unit coordinate interval different from the first unit coordinate interval is determined in the line arrangement direction and a reference position when the first printing section and the second printing section are disposed in a specific positional relationship in the line arrangement direction is in a predetermined reference relative positional relationship in the line arrangement direction with a reference position of the first coordinate axis; a printing position acquisition section which acquires a printing position in the line arrangement direction of each of the plurality of first lines and the plurality of second lines in the image capturing data; and a positional shift amount calculation section which specifies a relative positional relationship in the line arrangement direction between the reference position of the first coordinate axis and the reference position of the second coordinate axis from a correspondence relationship between the printing coordinate and the printing position that are acquired, and calculates a value corresponding to a positional shift amount from the specific positional relationship in the line arrangement direction of the second printing section with respect to the first printing section based on the specified relative positional relationship and the predetermined reference relative positional relationship.

The invention according to claim 2 is characterized in that, in the information processing device according to claim 1, the predetermined reference relative positional relationship is a positional relationship in which positions in the line arrangement direction of the reference position of the first coordinate axis and the reference position of the second coordinate axis match, and the positional shift amount calculation section specifies a relative positional relationship in the line arrangement direction between the first coordinate axis and the second coordinate axis based on a same coordinate at a position in the line arrangement direction where the first coordinate axis and the second coordinate axis have the same coordinate.

The invention according to claim 3 is characterized in that, in the information processing device according to claim 2, in a orthogonal coordinate system which has two axes of a third coordinate axis indicating the printing coordinates on the first coordinate axis and on the second coordinate axis with a common coordinate axis and a fourth coordinate axis indicating the printing positions, the positional shift amount calculation section calculates a first approximate straight line of a plurality of points respectively corresponding to combinations of the printing coordinates and the printing positions of the plurality of first lines and a second approximate straight line of a plurality of points respectively corresponding to combinations of the printing coordinates and the printing positions of the plurality of second lines, and acquires the same coordinate from a coordinate on the third coordinate axis of an intersection of the first approximate straight line and the second approximate straight line.

The invention according to claim 4 is characterized in that, in the information processing device according to any one of claims 1 to 3, the test image includes a first identification mark which is printed in a predetermined positional relationship with the plurality of first lines by the first printing section and a second identification mark which is printed in a predetermined positional relationship with the plurality of second lines by the second printing section, and the printing coordinate acquisition section acquires the printing coordinate on the first coordinate axis of at least one of the plurality of first lines based on a positional relationship in the line arrangement direction with the first identification mark, and acquires the printing coordinate on the second coordinate axis of at least one of the plurality of second lines based on a positional relationship in the line arrangement direction with the second identification mark.

The invention according to claim 5 is characterized in that, in the information processing device according to anyone of claims 1 to 3, each of the plurality of first lines and the plurality of second lines is printed at a predetermined interval, and the printing coordinate acquisition section acquires the printing coordinates of the plurality of first lines from the predetermined interval and values corresponding to numbers indicating arrangement orders of the plurality of first lines, and acquires the printing coordinates of the plurality of second lines from the predetermined interval and values corresponding to numbers indicating arrangement orders of the plurality of second lines.

The invention according to claim 6 is characterized in that, in the information processing device according to anyone of claims 1 to 5, each of the plurality of first lines and the plurality of second lines is three lines or more which are printed at an equal interval.

The invention according to claim 7 is characterized in that, in the information processing device according to claim 6, the printing coordinate acquisition section acquires values corresponding to numbers indicating arrangement orders of the plurality of first lines as the printing coordinates of the plurality of first lines, and acquires values corresponding to numbers indicating arrangement orders of the plurality of second lines as the printing coordinates of the plurality of second lines.

The invention according to claim 8 is characterized in that, in the information processing device according to anyone of claims 1 to 7, the printing coordinate acquisition section sets a printing coordinate of one of the plurality of first lines to the reference position of the first coordinate axis and sets a printing coordinate of one of the plurality of second lines to the reference position of the second coordinate axis.

The invention according to claim 9 is characterized in that, in the information processing device according to anyone of claims 1 to 8, the test image is formed by printing the plurality of first lines with printing elements disposed at positions which are different in a width direction orthogonal to a conveyance direction among the plurality of printing elements of the first printing section and printing the plurality of second lines with printing elements disposed at positions which are different in the width direction among the plurality of printing elements of the second printing section while the printing medium is moved with respect to the first printing section and the second printing section by a conveyance section which moves the printing medium in the conveyance direction, and the positional shift amount calculation section calculates a value corresponding to a positional shift amount in the width direction of the second printing section with respect to the first printing section as the value corresponding to the positional shift amount from the specific positional relationship.

The invention according to claim 10 is characterized in that, in the information processing device according to any one of claims 1 to 8, the test image is formed by printing the plurality of first lines with printing elements which are in a positional relationship of printing a continuous line among the plurality of printing elements of the first printing section and printing the plurality of second lines with printing elements which are in a positional relationship of printing a continuous line among the plurality of printing elements of the second printing section while the printing medium is moved with respect to the first printing section and the second printing section by a conveyance section which moves the printing medium in a conveyance direction, and the positional shift amount calculation section calculates a value corresponding to a positional shift amount in the conveyance direction of the second printing section with respect to the first printing section as the value corresponding to the positional shift amount from the specific positional relationship.

The invention according to claim 11 is characterized in that, in the information processing device according to anyone of claims 1 to 10, the printing position acquisition section sets a printing position acquisition line indicating a position to acquire the printing position in the line arrangement direction, and acquires, as the printing position, a position in the line arrangement direction of an intersection of a virtual line obtained by extending each of the plurality of first lines and the plurality of second lines and the printing position acquisition line.

The invention according to claim 12 is characterized in the information processing device according to anyone of claims 1 to 11, further including an image data correction section which corrects image data of an image printed on the printing medium by the first printing section and the second printing section based on the value corresponding to the positional shift amount calculated by the positional shift amount calculation section or the positional shift amount.

The invention of an image printing apparatus according to claim 13 is characterized in including: the information processing device according to any one of claims 1 to 12, and the first printing section and the second printing section.

The invention of an image printing apparatus according to claim 14 is characterized in including: the information processing device according to claim 9; the first printing section and the second printing section; and a printing timing correction section which corrects a timing when printing is performed on the printing medium by each of the first printing section and the second printing section based on the value corresponding to the positional shift amount calculated by the positional shift amount calculation section or the positional shift amount.

The invention of an image printing apparatus according to claim 15 is characterized in including: the information processing device according to claim 9; the first printing section and the second printing section; and a printing control section which, when a luminance transition range of changing a luminance between luminances of two uniform tone image regions is generated in image capturing data obtained by capturing the two uniform tone image regions with an image capturing section that captures the test image, the two uniform tone image regions being adjacent in the width direction and having different luminances, controls the first printing section to print the plurality of first lines so that an interval in the width direction of adjacent plurality of first lines is twice or more a distance on the printing medium corresponding to a length in the width direction of the luminance transition range, and controls the second printing section to print the plurality of second lines so that an interval in the width direction of adjacent plurality of second lines is twice or more the distance on the printing medium corresponding to the length in the width direction of the luminance transition range.

The invention of an image printing apparatus according to claim 16 is characterized in including: the information processing device according to claim 10; the first printing section and the second printing section; and a printing control section which, when a luminance transition range of changing a luminance between luminances of two uniform tone image regions is generated in image capturing data obtained by capturing the two uniform tone image regions with an image capturing section that captures the test image, the two uniform tone image regions being adjacent in the conveyance direction and having different luminances, controls the first printing section to print the plurality of first lines so that an interval in the conveyance direction of adjacent plurality of first lines is twice or more a distance on the printing medium corresponding to a length in the conveyance direction of the luminance transition range, and controls the second printing section to print the plurality of second lines so that an interval in the conveyance direction of adjacent plurality of second lines is twice or more a distance on the printing medium corresponding to a length in the conveyance direction of the luminance transition range.

The invention of an image printing apparatus according to claim 17 is characterized in including the information processing device according to claim 9; the first printing section and the second printing section; the conveyance section; an image capturing section which captures the test image printed on the printing medium by the plurality of image capturing elements that are arranged in the width direction over a printing range of the test image on the printing medium, and outputs the image capturing data; and a printing control section which controls the first printing section to print the plurality of first lines and controls the second printing section to print the plurality of second lines so that an interval of adjacent lines is three times or more and less than 30 times a disposition interval in the width direction of the plurality of image capturing elements.

In order to achieve the above object, the invention of an information processing method according to claim 18 is characterized in an information processing method for performing processing of specifying a positional relationship between a first printing section and a second printing section based on image capturing data of a test image that is printed on a printing medium by the first printing section and the second printing section in each of which a plurality of printing elements are arranged, the test image including a plurality of first lines which are printed by the first printing section so as to have printing positions different from each other in a line arrangement direction on the printing medium and a plurality of second lines which are printed by the second printing section so as to have printing positions different from each other in the line arrangement direction, and the information processing method including: a printing coordinate acquisition step of acquiring a printing coordinate on a first coordinate axis on the printing medium for each of the plurality of first lines and acquiring a printing coordinate on a second coordinate axis for each of the plurality of second lines, the first coordinate axis being an axis in which a predetermined first unit coordinate interval is determined in the line arrangement direction, and the second coordinate axis being an axis in which a second unit coordinate interval different from the first unit coordinate interval is determined in the line arrangement direction and a reference position when the first printing section and the second printing section are disposed in a specific positional relationship in the line arrangement direction is in a predetermined reference relative positional relationship in the line arrangement direction with a reference position of the first coordinate axis; a printing position acquisition step of acquiring a printing position in the line arrangement direction of each of the plurality of first lines and the plurality of second lines in the image capturing data; and a positional shift amount calculation step of specifying a relative positional relationship in the line arrangement direction between the reference position of the first coordinate axis and the reference position of the second coordinate axis from a correspondence relationship between the printing coordinate and the printing position that are acquired, and calculating a value corresponding to a positional shift amount from the specific positional relationship in the line arrangement direction of the second printing section with respect to the first printing section based on the specified relative positional relationship and the predetermined reference relative positional relationship.

Effects of the Invention

According to the present invention, there is an effect that a positional shift of a print head can be detected easily and with high accuracy.

BRIEF DESCRIPTION OF DRAWINGS

FIG. 5 This is a view showing an example of a test image used in calculation processing of a positional shift amount according to an alignment element A.

FIG. 7 This is a view showing an example of a test image used in calculation processing of a positional shift amount according to an alignment element B.

FIG. 9 This is a view showing an example of a test image used in calculation processing of a positional shift amount according to an alignment element C.

FIG. 11 This is a view showing an example of a test image used in calculation processing of a positional shift amount according to an alignment element D.

FIG. 15 This is a flow chart showing a control procedure of positional shift amount calculation processing.

FIG. 19 This is a view showing an example of a test image used in calculation processing of a positional shift amount according to a modification example 2.

EMBODIMENTS FOR CARRYING OUT THE INVENTION

Hereinafter, an embodiment according to an information processing device, an image printing apparatus and an information processing method of the present invention will be described with reference to the drawings.

(1. Configuration of Inkjet Printing Apparatus 1)

Figure 1:
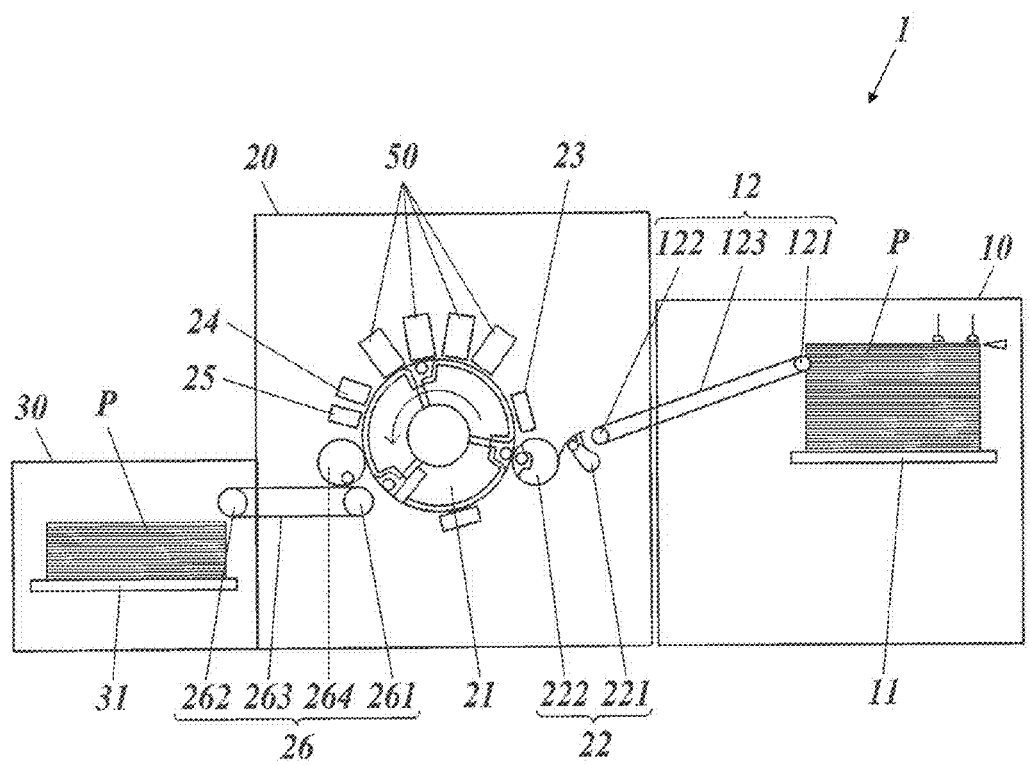
FIG. 1 This is a view showing a schematic configuration of an inkjet printing apparatus which is an embodiment of an image printing apparatus of the present invention.

FIG. 1 is a view showing a schematic configuration of an inkjet printing apparatus 1 which is an embodiment of the image printing apparatus of the present invention.

The inkjet printing apparatus 1 includes a sheet feeding section 10, an image printing section 20, a sheet ejection section 30, a control section 40 (FIG. 4) (information processing device) and such like. Under control by the control section 40, the inkjet printing apparatus 1 conveys a printing medium P stored in the sheet feeding section 10 to the image printing section 20, prints (forms) an image on the printing medium P with the image printing section 20 and conveys the printing medium P having the image printed thereon to the sheet ejection section 30. As the printing medium P, there can be used various media such as paper, fabric and sheet resin on which ink (color material) ejected onto the surface thereof can be fixed.

The sheet feeding section 10 has a sheet feeding tray 11 storing printing media P and a conveyance section 12 which conveys a printing medium P from the sheet feeding tray 11 to the image printing section 20.

The conveyance section 12 includes a belt 123 in a circle the inside of which is supported by two rollers 121 and 122. The conveyance section 12 conveys the printing medium P by rotating the rollers 121 and 122 while the printing medium P is placed on the belt 123.

The image printing section 20 has a conveyance drum 21 (conveyance section), a passing unit 22, a heating section 23, head units 50, a fixing section 24, a line sensor 25 (image capturing section) and a delivery section 26.

The conveyance drum 21 holds the printing medium P on the cylindrical outer circumferential surface (conveyance surface), and conveys the printing medium P in a conveyance direction (hereinafter, referred to as a Y direction) along the outer circumferential surface by rotating around the rotation shaft extending in the direction (hereinafter, referred to as a X direction) orthogonal to the drawing face of FIG. 1. The conveyance drum 21 includes a claw section and a suction section, which are not shown in the drawings, for holding the printing medium P on the outer circumferential surface. The printing medium P is held on the outer circumferential surface of the conveyance drum 21 by being pressed at the end sections thereof by the claw section and being sucked to the outer circumferential surface by the suction section.

The conveyance drum 21 includes a conveyance drum motor 21M (FIG. 4) for rotating the conveyance drum 21, and rotates by the angle proportional to the rotation amount of the conveyance drum motor 21M.

The passing unit 22 passes the printing medium P conveyed by the conveyance section 12 of the sheet feeding section 10 to the conveyance drum 21. The passing unit 22 is provided at a position between the conveyance section 12 of the sheet feeding section 10 and the conveyance drum 21, holds and takes up one end of the printing medium P conveyed from the conveyance section 12 with a swing arm section 221 and passes the printing medium P to the conveyance drum 21 via a passing drum 222.

The heating section 23 heats the printing medium P held by the conveyance drum 21. The heating section 23 has an infrared heater or the like, for example, and the infrared heater produces heat according to electric conduction. The heating section 23 is provided near the outer circumferential surface of the conveyance drum 21 so as to be located upstream of the head units 50 in the conveyance direction of the printing medium P. The production of heat of the heating section 23 is controlled by the control section 40 so that the printing medium P held by the conveyance drum 21 and passing near the heating section 23 is at a predetermined temperature.

The head units 50 eject ink to the printing medium P held by the conveyance drum 21 and print an image. The head units 50 are disposed so that the ink ejection surfaces face the outer circumferential surface of the conveyance drum 21 with a predetermined distance. The inkjet printing apparatus 1 in the embodiment includes four head units 50Y, 50M, 50C and 50K (hereinafter, also simply referred to as head units 50) corresponding to ink of four colors of yellow (Y), magenta (M), cyan (C) and black (K), and the four head units 50 are disposed at predetermined intervals in the order of Y, M, C and K colors from the upstream side along the conveyance direction of the printing medium P.

Figure 2:
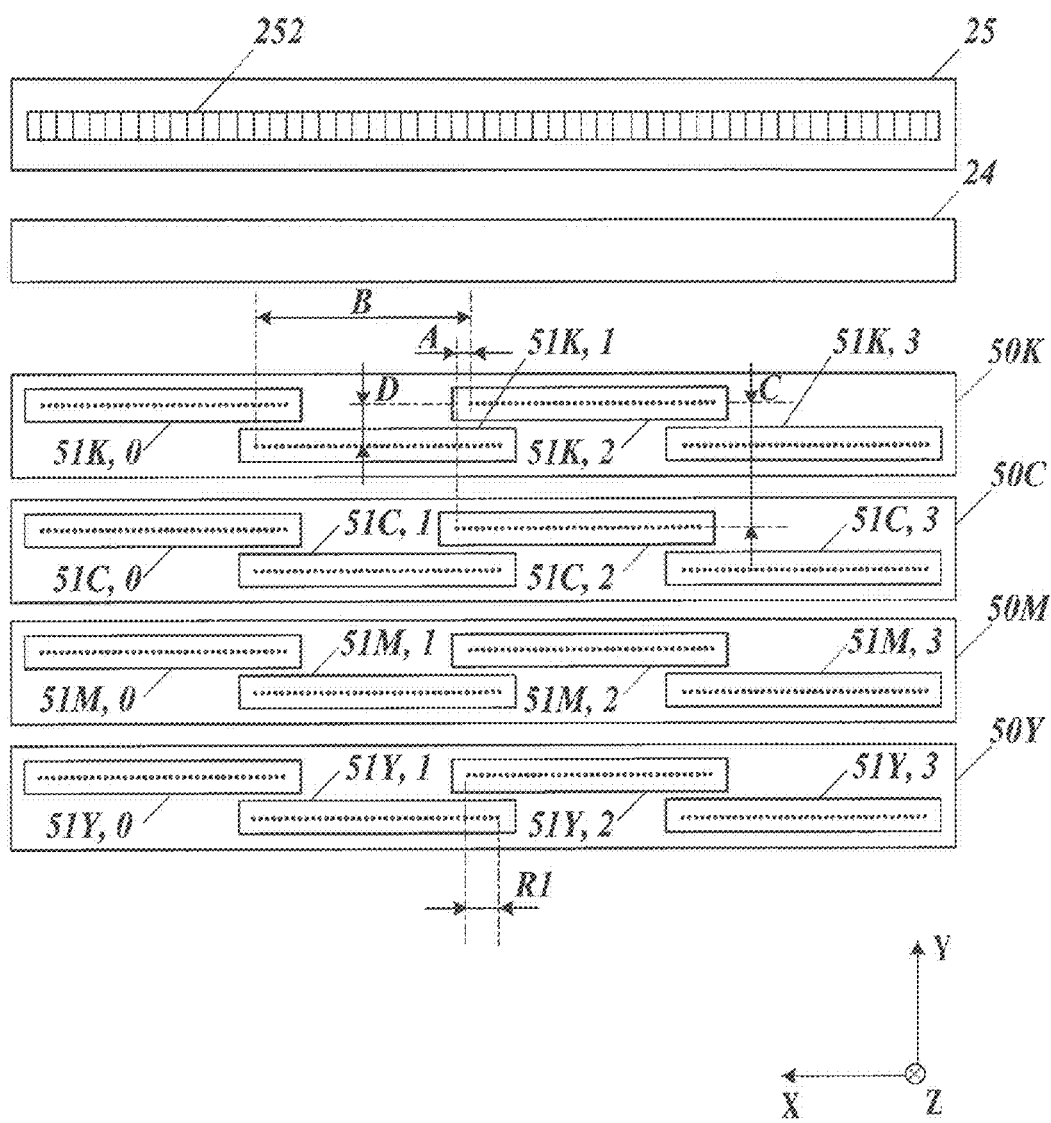
FIG. 2 This is a view for explaining arrangement of head units, a fixing section and a line sensor.

FIG. 2 is a view for explaining the disposition of the head units 50, the fixing section 24 and the line sensor 25. Here, FIG. 2 shows the head units 50, the fixing section 24 and the line sensor 25 seen from the side facing the outer circumferential surface of the conveyance drum 21.

The head unit 50Y corresponding to yellow ink has four print heads 51Y (printing sections) which are attached to an attachment member. Similarly, the head units 50M, 50C and 50K corresponding to magenta, cyan and black ink also have respective four print heads 51M, 51C and 51K (hereinafter, the print heads 51Y, 51M, 51C and 51K are also simply referred to as print heads 51).

The numbers 0 to 3 are respectively set to the four print heads 51Y in order from the +X direction side. Similarly, the numbers 0 to 3 are also set to each of the print heads 51M, 51C and 51K. Hereinafter, when indicating a print head 51 by including the number, the number is noted in brackets as in the print head 51Y(0).

FIG. 2 is drawn so that the position in the X direction of the print head 51C(2) is different from the position of the print head 51K(2) for after-mentioned explanation of a positional shift amount.

Each of the print heads 51 has a plurality of printing elements 52. Each of the printing elements 52 includes a pressure room for pooling ink, a piezoelectric element provided on the wall surface of the pressure room and a nozzle. When a drive voltage is applied from a drive circuit of the print head 51 to the piezoelectric element, the pressure in the pressure room changes according to the magnitude of drive voltage, and ink is ejected from the nozzle communicated with the pressure room. The nozzle of each of the printing elements 52 has an opening on the surface (ink ejection surface) closer to the conveyance drum 21 of the head unit 50. In FIG. 2, a part of the openings of the nozzles included in the printing elements 52 are drawn as dots.

The nozzles of the plurality of printing elements 52 included in a print head 51 are arranged over a printing width of printing to the printing medium P in the width direction (X direction) orthogonal to the conveyance direction (Y direction) of the printing medium P on the surface of the print head 51 facing the conveyance drum 21. In the embodiment, the printing elements 52 are arranged at equal intervals in the X direction. The row of nozzles of the printing elements 52 may not be necessarily disposed in the direction orthogonal to the conveyance direction as long as the row is disposed in a direction crossing the conveyance direction. Each of the print heads 51 may be configured so that two rows or more of the printing elements 52 arranged in the X direction are provided and each of the two rows or more of the printing elements 52 is disposed at a position different from each other in the X direction as a whole. In this Specification, the arrangement of the printing elements 52 means the arrangement of the positions of the nozzles in the printing elements 52.

The four print heads 51 included in each of the head units 50 are arranged in a staggered manner so as to have arrangement ranges in the X direction partially overlapping each other, and, along the X direction, the first and the third printing elements 52 are located on a same line and the printing elements 52 of the second and the fourth print heads 51 are located on a same line. In a part of an overlapping portion in the X direction of adjacent print heads 51, the arrangement ranges in the X direction of the printing elements 52 included in the respective print heads 51 overlap each other. For example, for the print head 51Y(1) and the print head 51Y(2), the arrangement ranges in the X direction of the printing elements 52 overlap in the range R1 shown in FIG. 2. In the inkjet printing apparatus 1 in the embodiment, each of the print heads 51 includes approximately 3500 printing elements 52, and approximately 50 printing elements 52 among them are included in the overlapping portion of the arrangement range in the X direction of the printing elements 52. In the overlapping portion, image printing is set to be performed only by the printing elements 52 of one of the two print heads 51 having the printing elements 52 in the overlapping portion.

The arrangement range in the X direction of the printing elements 52 included in a head unit 50 covers the width in the X direction of the region to print an image in the printing medium P which is held and conveyed by the conveyance drum 21, and the head unit 50 is used while the position thereof is fixed with respect to the conveyance drum 21 when the image is printed. That is, the inkjet printing apparatus 1 is an inkjet printing apparatus of the single-pass system. The printing resolution in the X direction and the Y direction of the head unit 50 in the embodiment is 1200 dpi, and the printing elements 52 included in the head unit 50 are disposed at a density of 1200 printing elements 52 per inch in the X direction.

In the embodiment, as the ink ejected from the nozzles of the printing elements 52, there are used various types of known inks having properties of changing the phase to gel or sol according to the temperature.

The print head 51 includes an ink heating section not shown in the drawings. The ink heating section operates under control by the control section 40 and heats the ink to a temperature changing the phase to sol. The printing elements 52 eject ink which was heated and turned to sol.

The fixing section 24 has a fluorescent tube such as a low-pressure mercury lamp, emits energy ray such as ultraviolet ray by light emission of the fluorescent tube to the printing medium P held on the outer circumferential surface of the conveyance drum 21, and cures and fixes the ink ejected onto the printing medium P. The fixing section 24 is disposed downstream of the head units 50 in the conveyance direction.

The line sensor 25 is disposed at a position downstream of the fixing section 24 in the Y direction, captures an image printed on the printing medium P which is held and conveyed by the conveyance drum 21, and outputs two-dimensional image capturing data.

Figure 3:
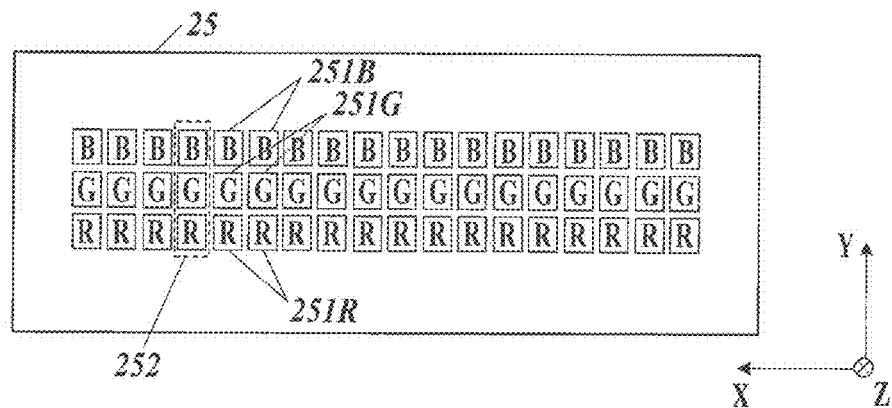
FIG. 3 This is a schematic view showing a light incident surface of the line sensor.

FIG. 3 is a schematic view showing a light incident surface of the line sensor 25. Here, there is shown the surface (light incident surface) of the line sensor 25 on the side facing the conveyance drum 21. The line sensor 25 includes a plurality of image capturing elements 251R, a plurality of image capturing elements 251G and a plurality of image capturing elements 251B each of which is one-dimensionally arranged in the X direction. The image capturing elements 251R, 251G and 251B (hereinafter, also simply referred to as image capturing elements 251) receive, with light receiving sections, light emitted from a light source (not shown in the drawings) and reflected on the surface of the printing medium P, and output signals corresponding to intensities of wavelength components of red color (R), green color (G) and blue color (B), respectively.

In FIG. 3, the image capturing elements 251R, 251G and 251B are respectively represented by rectangular forms described "R", "G" and "B". The image capturing elements 251 are disposed with the light receiving sections exposed to the surface facing the conveyance drum 21 of the line sensor 25. As the image capturing elements 251, there can be used a CMOS (Complementary Metal Oxide Semiconductor) sensor, a CCD (Charge Coupled Device) sensor or the like including a photodiode as a photoelectric conversion element, for example.

The image capturing elements 251R, 251G and 251B are arranged in this order in the Y direction, and a set of image capturing elements 251R, 251G and 251B arranged in the Y direction forms a pixel 252 of the line sensor 25. Optical detection is performed in each of the pixels 252 by any of the image capturing elements 251R, 251G and 251B and pixel data is output. Optical detection may be performed to each of the pixels 252 by two or more of the image capturing elements 251R, 251G and 251B.

The line sensor 25 converts an analog signal output from each of the pixels 252 into a digital signal, and outputs the digital signal indicating image capturing data including pixel data from each of the pixels 252 to the control section 40. In the embodiment, the resolution in the width direction (X direction) of the image capturing data output from the line sensor 25 is 600 dpi, and the resolution in the conveyance direction (Y direction) is 300 dpi.

The delivery section 26 has a belt 263 in a circle the inside of which is supported by two rollers 261 and 262 and a cylindrical passing drum 264 which passes the printing medium P from the conveyance drum 21 to the belt 263, and the delivery section 26 conveys, with the belt 263, the printing medium P passed onto the belt 263 from the conveyance drum 21 with the passing drum 264 and transmits the printing medium P to the sheet ejection section 30.

The sheet ejection section 30 has a plate-like sheet ejection tray 31 on which the printing medium P transmitted from the image printing section 20 by the delivery section 26 is placed.

Figure 4:
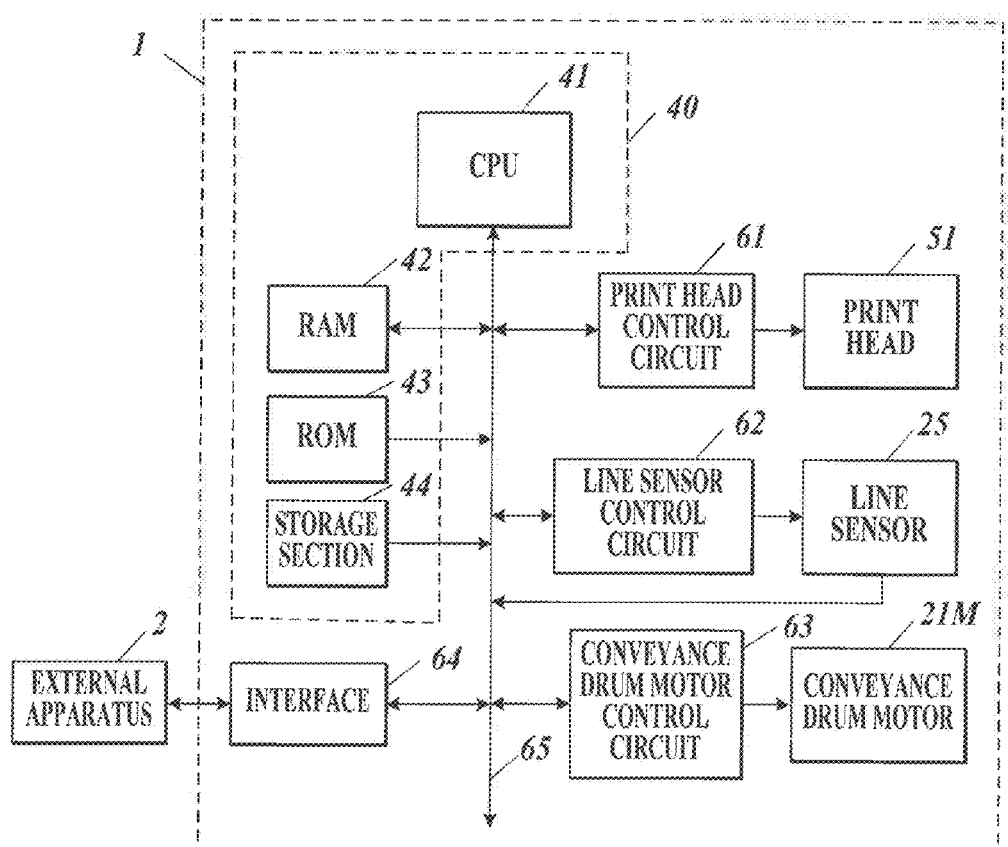
FIG. 4 This is a block diagram showing a main functional configuration of the inkjet printing apparatus.

FIG. 4 is a block diagram showing a main functional configuration of the inkjet printing apparatus 1.

The inkjet printing apparatus 1 includes a control section 40 which includes a CPU 41 (Central Processing Unit) (printing coordinate acquisition section, printing position acquisition section, positional shift amount calculation section, image data correction section, printing timing correction section and printing control section), a RAM 42 (Random Access Memory), a ROM 43 (Read Only Memory) and a storage section 44, a print head control circuit 61 which is connected to the print head 51, a line sensor control circuit 62 which is connected to the line sensor 25, a conveyance drum motor control circuit 63 which is connected to the conveyance drum motor 21M, an interface 64 which is connected to an external apparatus 2 and such like. The CPU 41 is connected to the RAM 42, the ROM 43, the print head control circuit 61, the line sensor control circuit 62, the conveyance drum motor control circuit 63 and the interface 64 via a bus 65.

The CPU 41 performs various types of calculation processing and integrally controls the entire operation of the inkjet printing apparatus 1. For example, the CPU 41 controls the printing elements 52 of the print head 51 to eject ink and print an image on the printing medium P by controlling the print head control circuit 61 to output image data of the image to be printed on the printing medium P to the print head 51. The CPU 41 controls the line sensor 25 to capture the image printed on the printing medium P by outputting a control signal from the line sensor control circuit 62 to the line sensor 25. The CPU 41 controls the conveyance drum 21 to rotate by controlling the conveyance drum motor control circuit 63 to output a control signal to a drive circuit of the conveyance drum motor 21M to operate the conveyance drum motor 21M. The CPU 41 calculates the positional shift amount of the print head 51 on the basis of the image capturing data by the line sensor 25 and stores the calculated amount in the RAM 42. The CPU 41 corrects image data of the image to be printed on the printing medium P by using the data of the positional shift amount stored in the RAM 42 and stores the corrected image data in the storage section 44.

The RAM 42 provides working memory space to the CPU 41, and stores temporal data. The RAM 42 also stores data on an after-mentioned distance corresponding to a unit coordinate interval of a coordinate axis X1 (Y1), data on a rate of a unit coordinate interval between the coordinate axis X1 (Y1) and coordinate axis X2 (Y2) and a positional shift amount calculated by the CPU 41. The RAM 42 may include a non-volatile storage section.

The ROM 43 stores various types of control programs executed by the CPU 41, setting data and such like. The programs include, for example, a program for calculating the positional shift amount of the print head 51 and an image printing program for correcting image data and printing an image on the printing medium P by using the corrected image data. A rewritable non-volatile memory such as an EEPROM (Electrically Erasable Programmable Read Only Memory) and a flash memory may be used instead of the ROM 43.

The storage section 44 is configured by including a DRAM (Dynamic Random Access Memory) or the like, and stores image data input from the external apparatus 2 via the interface 64, the image capturing data acquired by image capturing with the line sensor 25, image data which was corrected by using the positional shift amount of the print head 51 and such like. These image data and such like may be stored in the RAM 42.

The print head control circuit 61 outputs, to the print head 51, a control signal (image data) determining a timing and/or magnitude of the drive voltage applied from the drive circuit of the print head 51 to the piezoelectric element of the printing element 52 on the basis of a signal input from the CPU 41, the image data stored in the storage section 44 and such like.

The line sensor control circuit 62 outputs a control signal for controlling the line sensor 25 to perform image capturing at a predetermined timing to the line sensor 25 on the basis of a signal input from the CPU 41 or the like.

The conveyance drum motor control circuit 63 outputs a control signal for operating the conveyance drum motor 21M to the conveyance drum motor 21M on the basis of the signal input from the CPU 41.

The interface 64 is a section which performs transmission and reception of data with the external apparatus 2, and configured by any of various serial interfaces and various parallel interfaces or a combination thereof.

The external apparatus 2 is a personal computer, for example, and supplies image data and such like of an image to be printed by the inkjet printing apparatus 1 to the control section 40 via the interface 64.

(2. Method for Calculating Positional Shift Amount and Correction Operation)

Next, calculation of a positional shift amount of a print head 51 in the inkjet printing apparatus 1 and correction operation of image data and ink ejection timing (printing timing) based on the calculation result will be described.

Since a positional difference between adjacent pixels printed by the inkjet printing apparatus 1 is approximately 20 μm both in the X direction and the Y direction, a positional shift to some degree with respect to a predetermined position is generated in the disposition of each of the print heads 51 in many cases.

Thus, in the inkjet printing apparatus 1, there is performed positional shift amount calculation processing of calculating a positional shift amount (quantity and direction of the positional shift) in the X and Y directions from a positional relationship satisfying a specific condition of each of the print heads 51 with respect to the print head 51K(2) as a reference. There is also performed image printing processing of printing an image by using corrected image data, which was corrected by using the X direction component of the calculated positional shift amount, and correcting the ejection timing of ink from the printing elements 52 by using the Y direction component of the calculated positional shift amount.

The detection of positional shift amount is performed for each of four alignment elements A to D (alignment elements).

The alignment element A is an alignment in the X direction of print heads 51 which are included in different head units 50 and have a same number. The quantity and the direction of a positional shift of a print head 51 for the alignment element A are represented by a positional shift amount $G_A$ in the X direction from a positional relationship satisfying a specific condition between print heads 51 having a same number. For the alignment element A, the positional shift amount $G_A$ from a positional relationship satisfying a specific condition is calculated for a positional relationship in the X direction between the print head 51K(#2) and the print head 51C(#2) indicated by the reference A in FIG. 2, for example.

The alignment element B is an alignment in the X direction of print heads 51 included in a same head unit 50. The quantity and the direction of a positional shift of a print head 51 for the alignment element B is represented by a positional shift amount $G_B$ in the X direction from a positional relationship satisfying a specific condition of print heads 51 included in a same head unit 50. For the alignment element B, the positional shift amount $G_B$ from a positional relationship satisfying a specific condition is calculated for a positional relationship in the X direction between the print head 51K(1) and the print head 51K(2) indicated by a reference B in FIG. 2, for example.

The alignment element C is an alignment in the Y direction of print heads 51 included in different head units 50 and having a same number. The quantity and the direction of a positional shift of a print head 51 for the alignment element C are represented by a positional shift amount $G_C$ in the Y direction from a positional relationship satisfying a specific condition of print heads 51 having a same number. For the alignment element C, the positional shift amount $G_C$ from a positional relationship satisfying a specific condition is calculated for a positional relationship in the Y direction between the print head 51K(2) and the print head 51C(2) indicated by a reference C in FIG. 2, for example.

The alignment element D is an alignment in the Y direction of print heads 51 included in a same head unit 50. The quantity and the direction of a positional shift of a print head 51 for the alignment element D are represented by a positional shift amount $G_D$ in the Y direction from a positional relationship satisfying a specific condition of print heads 51 included in a same head unit 50. For the alignment element D, the positional shift amount $G_D$ from a positional relationship satisfying a specific condition is calculated for a positional relationship in the Y direction between the print head 51K(1) and the print head 51K(2) indicated by a reference D in FIG. 2, for example.

In the positional shift amount calculation processing, there are calculated positional shifts $g_A$, $g_B$, $g_C$ and $g_D$ indicating quantities in respective directions of positional shift with a unit (unit length) of a predetermined length by printing a test image on a printing medium P and analyzing image capturing data acquired by capturing the test image with the line sensor 25. Then, there are calculated positional shift amounts $G_A$, $G_B$, $G_C$ and $G_D$ which are represented by a same dimension as the coordinate according to the disposition of print head 51 by multiplying the positional shifts $g_A$, $g_B$, $g_C$ and $g_D$ by the unit length.

(2-1. Calculation Method of Positional Shift Amount $G_A$ for the Alignment Element A)

FIG. 5 is a view showing an example of a test image used in calculation processing of the positional shift amount $G_A$ for the alignment element A. The test image includes a line pattern 70A and a reference mark 80A (first identification mark) printed by the print head 51K(2) (first printing section) which is a reference for positional shift amount calculation, and a line pattern 70B and a reference mark 80B (second identification mark) printed by the print head 51C(2) (second printing section) which is a test target of the positional shift. Hereinafter, the line patterns 70A and 70B are also simply referred to as line patterns 70, and the reference marks 80A and 80B are also simply referred to as reference marks 80.

Though FIG. 5 shows the printing medium P and the print heads 51 seen from the side opposite to the side facing the outer circumferential surface of the conveyance drum 21, for convenience of indicating the positions of printing elements 52, the printing elements 52 are shown in the print heads 51 (The same applies to FIGS. 7, 9, 11, 17 and 19).

The line pattern 70A includes a plurality of lines 71A (first lines) parallel to the conveyance direction which are respectively printed to the conveyed printing medium P by ejecting ink from the printing elements 52 that are disposed so as to separate from each other in the print head 51K(2). The line pattern 70B includes a plurality of lines 71B (second lines) parallel to the conveyance direction which are respectively printed to the conveyed printing medium P by ejecting ink onto the printing medium P from the printing elements 52 that are disposed so as to separate from each other in the print head 51C(2).

The line pattern 70A is printed so that a printing element 52 is selected for every eight printing elements 52, and the disposition interval in the X direction of the lines 71A is a distance 8s when the disposition interval in the X direction of printing elements 52 is a distance s. Each of the lines 71A is orthogonal to a virtual coordinate axis X1 (first coordinate axis) in the X direction (line arrangement direction) set on the printing medium P, and a coordinate (printing coordinate) of the line 71A with respect to the coordinate axis X1 is determined in advance. Specifically, the lines 71A are printed at the positions where the printing coordinates on the coordinate axis X1 are 0, ±1, ±2, ±3 and ±4. In other words, the coordinate axis X1 is set to have the unit coordinate interval (8s) (first unit coordinate interval) so that the printing coordinates of the lines 71A are respectively 0, ±1, ±2, ±3 and ±4.

The line pattern 70B is printed so that the disposition interval in the X direction of the lines 71B is a distance 9s.

That is, each of the lines 71B is printed so that a printing element 52 is selected for every nine printing elements 52 in the print head 51C(2) and the disposition interval in the X direction of the lines 71B is a distance 9s. Each of the lines 71B is orthogonal to the virtual coordinate axis X2 (second coordinate axis) in the X direction set on the printing medium P, and a printing coordinate (printing coordinate) of the line 71B with respect to the coordinate axis X2 is determined in advance. Specifically, the lines 71B are printed at the positions where the printing coordinates on the coordinate axis X2 are 0, ±1, ±2, ±3 and ±4. In other words, the coordinate axis X2 is set to have the unit coordinate interval (9s) (second unit coordinate interval) so that the printing coordinates of the lines 71B are 0, ±1, ±2, ±3 and ±4.

The unit coordinate interval of the coordinate axis X2 is 9/8 times the unit coordinate interval of the coordinate axis X1. Hereinafter, this rate (rate of unit coordinate interval of coordinate axis X2 to unit coordinate interval of coordinate axis X1) is referred to as $r_A$.

It can be said that the absolute values of the coordinates on the coordinate axes X1 and X2 represent numbers (line numbers) indicating the arrangement orders of the lines 71A and 71B with respect to the original points as a reference and the signs of the coordinates represent the arrangement directions of the lines 71 with respect to the original points. The coordinate axes X1 and X2 and the coordinates thereon drawn in FIG. 5 are for explanation of the test image and not printed on the printing medium P. The same applies to FIGS. 7, 17 and 19 to be described later.

The positions in the X direction of the original points (reference positions) on the coordinate axes X1 and X2 are same (reference relative positional relationship) when the print head 51C(2) is disposed in a positional relationship (specific positional relationship) satisfying a specific condition in the X direction with respect to the print head 51K(2). Here, the specific condition is that positions in the X direction of respective corresponding printing elements 52 in the print head 51K(2) and the print head 51C(2) match each other. The corresponding printing elements 52 are printing elements 52 which have positions (numbers indicating arrangement orders of the printing elements 52) in the print head 51 equal to each other among the printing elements 52 in the different print heads 51, for example. With reference to FIG. 5, description is made by taking, as an example, a case where the print head 51C(2) is not in the positional relationship satisfying the above specific condition with respect to the print head 51K(2), and a positional shift in the X direction is generated.

Each of the reference marks 80 is printed to be formed by a plurality of printing elements 52 in a positional relationship such that the ink ejected onto the printing medium P is connected to be continuous in the X direction. The reference mark 80 is a square mark having the length in the X direction which is longer than the line 71 and smaller than the printing width in the X direction of the line pattern 70. Accordingly, the reference mark 80 is easily distinguished from the lines 71 in the test image including the plurality of lines 71 and used as a reference when acquiring positions in the X direction of lines 71 from the image capturing data of the test image. Here, since the reference mark 80 is a mark occupying a certain area, the position of the reference mark 80 is represented by a predetermined reference position in the reference mark 80. Though the reference position can be an arbitrary point in the reference mark 80, in the embodiment, the centroid of the reference mark 80 is set to be the reference position. In the test image of FIG. 5, the reference marks 80A and 80B are printed so that the positions in the X direction of the reference positions match the original points of the coordinate axes X1 and X2 in the X direction, respectively.

Next, the calculation method of the positional shift $g_A$ and the positional shift amount $G_A$ of a print head 51 in the positional shift amount calculation processing will be described.

In the calculation method, the test image shown in FIG. 5 is first printed on the printing medium P by the head units 50 and image capturing data is acquired by capturing the test image with the line sensor 25. The positional shift $g_A$ of the print head 51 is calculated by acquiring and analyzing luminance data in the image capturing data.

Specifically, from the image capturing data, for each of the plurality of lines 71A, the printing position in the X direction (line arrangement direction) in the image capturing data and the printing coordinate on the coordinate axis X1 are acquired, and, for each of the plurality of lines 71B, the printing position in the X direction in the image capturing data and the printing coordinate on the coordinate axis X2 are acquired.

Next, straight lines each indicating a correspondence relationship between the printing coordinates and the printing positions acquired for each of the plurality of lines 71A and 71B are derived.

Figure 6:
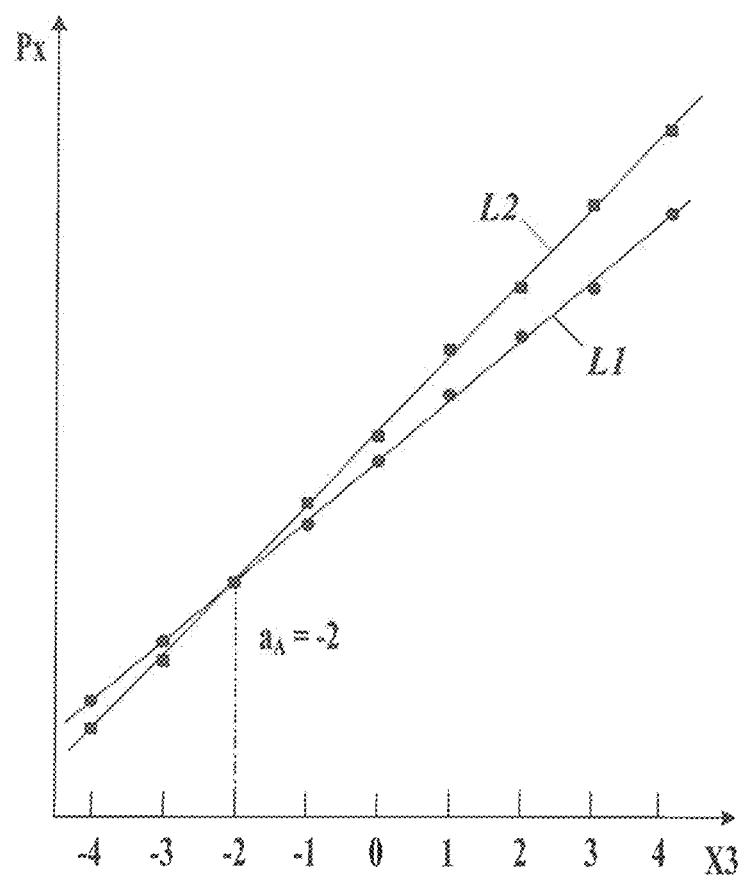
FIG. 6 This is a view for explaining straight lines showing correspondence relationships between printing coordinates and printing positions of a plurality of lines.

FIG. 6 is a view for explaining straight lines L1 and L2 indicating correspondence relationships between the printing coordinates and the printing positions of the plurality of lines 71A and 71B. The straight line L1 (first approximate straight line) and the straight line L2 (second approximate straight line) are represented in an orthogonal coordinate system having two axes of a coordinate axis X3 (third coordinate axis) indicating the coordinates of the coordinate axes X1 and X2 with a common coordinate axis and a coordinate axis Px (fourth coordinate axis) indicating the position in the X direction in the image capturing data. In the orthogonal coordinate system, a plurality of points corresponding to each of the plurality of lines 71A and 71B are plotted, and the coordinates on the coordinate axis X3 of the respective points indicate the printing coordinates of the lines 71, and the coordinates on the coordinate axis Px indicate the printing positions of the lines 71. The straight line L1 is acquired by deriving, with the least squares method, an approximate straight line which most applies to the plurality of points corresponding to the plurality of lines 71A, and the straight line L2 is acquired by deriving, with the least squares method, an approximate straight line which most applies to the plurality of points corresponding to the plurality of lines 71B.

Here, the coordinate $a_A$ on the coordinate axis X3 of the intersection of the straight lines L1 and L2 corresponds to the coordinate at the position in the X direction where the coordinates on the coordinate axis X1 and the coordinate axis X2 are same in the test image shown in FIG. 5 and the image capturing data thereof. When the coordinates of the coordinate axis X1 and the coordinate axis X2 are same at the position of the coordinate $a_A$, the positional shift on the coordinate axis X1 of the original point of the coordinate axis X2 with respect to the original point of the coordinate axis X1 is represented as $(-(r_A-1) \times a_A)$ by using the above rate $r_A$. Here, the value of the $(r_A-1)$ represents the difference between the unit coordinate intervals of the coordinate axes X1 and X2 per unit coordinate interval of the coordinate axis X1.

The positional shift between the original points of the coordinate axes X1 and X2 corresponds to the positional shift $g_A$ in the X direction with a unit of the unit coordinate interval of the coordinate axis X1 from the positional relationship satisfying a specific condition of the print head 51C(2) to the print head 51K(2). The positional shift amount $G_A$ is calculated by multiplying the positional shift $g_A$ by a distance corresponding to the unit coordinate interval of the coordinate axis X1. Since $r_A>1$, when the positional shift $g_A$ is a positive value, it is indicated that the positional shift amount $G_A$ of the print head 51C(2) to the print head 51K(2) is +X direction, and when the positional shift $g_A$ is a negative value, it is indicated that the positional shift amount $G_A$ of the print head 51C(2) to the print head 51K(2) is −X direction.

In the example of FIGS. 5 and 6, since the coordinate $a_A$ is (−2) and the rate $r_A$ is 1.125 (9/8), the positional shift $g_A$ is calculated to 0.25. Since the unit coordinate interval of the coordinate axis X1 is a distance 8s, the positional shift amount $G_A$ corresponding to the positional shift $g_A$ is calculated to a distance 2s. Thus, it is detected that the print head 51C(2) generates a positional shift by the distance 2s in the +X direction with respect to the print head 51K(2).

Though FIGS. 5 and 6 show an example of calculating the positional shift amount $G_A$ of the print head 51C(2) to the print head 51K(2), the positional shift amounts $G_A$ of the print heads 51M(2) and 51Y(2) are similarly calculated with respect to a black print head 51K(2) as a reference. In a case of capturing, with the line sensor 25, the test images for calculating the positional shift amounts $G_A$ of the print heads 51C(2), 51M(2) and 51Y(2) with respect to the print head 51K(2) as a reference, only the respective image capturing elements 251R, 251G and 251B in the pixels 252 of the line sensor 25 are used.

(2-2. Calculation Method of Positional Shift Amount $G_B$ for the Alignment Element B)

FIG. 7 is a view showing an example of a test image used for calculation processing of a positional shift amount $G_B$ for the alignment element B. The test image of FIG. 7 is different from that of FIG. 5 in the arrangement of print heads 51 and lines 71A and 71B used for printing, and common to FIG. 5 in the other respects. Thus, hereinafter, the description is made centering on the difference from FIG. 5.

The test image shown in FIG. 7 includes a line pattern 70A and a reference mark 80A printed by the print head 51K(2) which is a reference for the positional shift amount calculation, and a line pattern 70B and a reference mark 80B printed by the print head 51K(1) which is a test target of the positional shift.

The plurality of lines 71A included in the line pattern 70A is printed so that a printing element 52 is selected for every eight printing elements 52 of the print head 51k(2) and the disposition interval in the X direction of the lines 71A is a distance 8s. The printing coordinates on the coordinate axis X1 of the respective lines 71A are 0, −1, −2, −3 and −4. The plurality of lines 71B included in the line pattern 70B is printed so that a printing element 52 is selected for every nine printing elements 52 of the print head 51k(1) and the disposition interval in the X direction of the lines 71A is a distance 9s. The printing coordinates on the coordinate axis X2 of the respective lines 71B are 0, 1, 2, 3 and 4. Accordingly, the rate $r_A$ of the unit coordinate interval of the coordinate axis X2 to the unit coordinate interval of coordinate axis X1 is 9/8 similarly to the rate $r_A$.

The line 71A corresponding to the original point of the coordinate axis X1 is printed by the printing element 52 among the printing elements 52 of the print head 51K(1), the printing element 52 being near the center of the range R1 which has an overlapping arrangement range in the X direction of the printing elements 52 included in the print heads 51K(1) and 51K(2). The line 71B corresponding to the original point of the coordinate axis X2 is printed by the printing element 52 among the printing elements 52 of the print head 51K(1), the printing element 52 being disposed at the same position in the X direction as that of the printing element 52 corresponding to the line 71A of the original point of the coordinate axis X1 when alignment for the alignment element B is appropriate (when the alignment is in a positional relationship satisfying a specific condition). With reference to FIG. 7, description is made by taking, as an example, a case where the print head 51K(1) is not in a positional relationship satisfying the above specific condition with respect to the print head 51K(2) and a positional shift in the X direction is generated.

The calculation method of the positional shift $g_B$ and the positional shift amount $G_B$ of the print head 51 are similar to the example of FIG. 5. That is, straight lines each indicating a correspondence relationship between the printing coordinates and the printing positions acquired for each of the lines 71A and 71B are derived from the image capturing data of the test image, and a positional shift $g_B$ is calculated from the coordinate $a_B$ of the intersection of the straight lines L1 and L2 and the rate $r_B$. Then, the positional shift amount $G_B$ is calculated by multiplying the positional shift $g_B$ by a distance corresponding to the unit coordinate interval of the coordinate axis X1.

Figure 8:
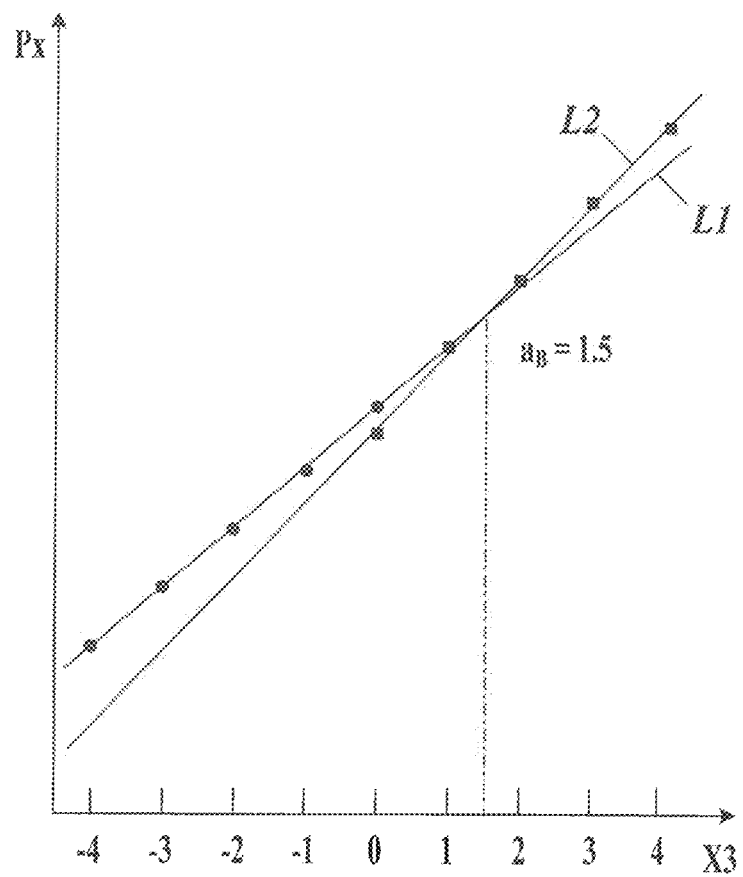
FIG. 8 This is a view for explaining straight lines showing correspondence relationships between printing coordinates and printing positions of a plurality of lines.

FIG. 8 is a view for explaining the straight lines L1 and L2 indicating the correspondence relationship between the printing coordinate and printing position of the plurality of lines 71A and 71B.

In the example of FIGS. 7 and 8, the coordinate $a_B$ of the intersection of the straight lines L1 and L2 is calculated to 1.5. Since the rate $r_B$ is 1.125 (9/8), the positional shift $g_B$ in the coordinate axis X1 is calculated to (−0.1875). Since the unit coordinate interval of the coordinate axis X1 is a distance 8s, the positional shift amount $G_B$ corresponding to the positional shift $g_B$ is calculated to the distance (−1.5s). Thus, it is detected that the print head 51K(1) generates a positional shift by the distance 1.5s in −X direction with respect to the print head 51K(2).

Though FIGS. 7 and 8 show an example of calculating the positional shift amount $G_B$ of the print head 51K(1) to the print head 51K(2), the positional shift amounts $G_B$ of the print heads 51K(0), 51K(3) to the print head 51K(2) are calculated similarly. Further, with respect to the print heads 51C(2), 51M(2) and 51Y(2) as references, the positional shift amounts $G_B$ of the other three print heads 51 corresponding to the same colors as the respective print heads 51 are calculated. In a case where the line sensor 25 is used to perform image capturing of the test images for calculation of the positional shift amounts $G_B$ of the other print heads with respect to the print heads 51C(2), 51M(2) and 51Y(2) as references, only the image capturing elements 251R, 251G and 251B in the pixels 252 of the line sensor 25 are respectively used. In a case where the line sensor 25 is used to perform image capturing of test images for calculation of the positional shift amounts $G_B$ of the other print heads 51K with respect to the print head 51K(2) as a reference, there may be used the same image capturing elements selected from the image capturing elements 251R, 251G and 251B.

(2-3. Calculation Method of Positional Shift Amount $G_C$ for Alignment Element C)

FIG. 9 is a view showing an example of a test image used for calculation processing of a positional shift amount $G_C$ for the alignment element C. The test image of FIG. 9 is different from FIG. 5 in the arrangement and direction of print heads 51 used for printing and the lines 71A and 71B, and common to FIG. 5 in other respects. Thus, hereinafter, the description is made centering on the difference from FIG. 5.

The test image shown in FIG. 9 includes a line pattern 70A and a reference mark 80A printed by the print head 51K(2) which is a reference for positional shift amount calculation, and a line pattern 70B and a reference mark 80B printed by the print head 51C(2) which is a test target of the positional shift.

The line pattern 70A includes a plurality of lines 71A (first lines) which are parallel to the X direction printed by the printing elements 52 included in the print head 51K(2). The line pattern 70B includes a plurality of lines 71B (second lines) which are parallel to the X direction printed by the printing elements 52 included in the print head 51C(2). Each of the lines 71 is formed by a plurality of printing elements 52 in a positional relationship such that the ink ejected onto the printing medium P is connected to be continuous (printing a continuous line). The position in the Y direction of each of the lines 71 is determined by the timing to eject the ink from the print head 51 to the printing medium P conveyed by the conveyance drum 21.

The line pattern 70A is printed so that the disposition interval in the Y direction of the lines 71A is a distance for the amount of eight printing pixels. Since both of the printing resolutions in the X direction and the Y direction of the inkjet printing apparatus 1 in the embodiment are 1200 dpi, the distance corresponds to the distance 8s. Each of the lines 71A is orthogonal to the virtual coordinate axis Y1 (first coordinate axis) in the Y direction (line arrangement direction) set on the printing medium P, and the printing coordinates on the coordinate axis Y1 are determined to be 0, ±1, ±2, ±3 and ±4.

The line pattern 70B is printed so that the disposition interval in the Y direction of the lines 71B is the amount of nine printing pixels, that is, a distance 9s. Each of the lines 71B is orthogonal to the virtual coordinate axis Y2 (second coordinate axis) in the Y direction set on the printing medium P, and printed at the positions where the printing coordinates on the coordinate axis Y2 are 0, ±1, ±2, ±3 and ±4.

Thus, the rate $r_C$ of the unit coordinate interval (second unit coordinate interval) of the coordinate axis Y2 to the unit coordinate interval (first unit coordinate interval) of the coordinate axis Y1 is 9/8.

It can be said that the absolute values of the coordinates on coordinate axes Y1 and Y2 represent arrangement numbers (line numbers) of the lines 71A and 71B with respect to the original points as a reference and the signs of the coordinates represent the arrangement directions of the lines 71 with respect to the original points. The coordinate axes Y1 and Y2 and the coordinates thereof drawn in FIG. 9 are for explanation of the test image and not printed on the printing medium P. The same applies to FIG. 11 to be described later.

The line 71A printed at the position corresponding to the original point of the coordinate axis Y1 and the line 71B printed at the position corresponding to the original point of the coordinate axis Y2 are printed respectively by the print heads 51K(2) and 51C(2) at the ink ejection timings such that the printing positions in the Y direction are the same (reference relative positional relationship) when alignment for the alignment element C of the print heads 51K(2) and 51C(2) is appropriate (in a case of a positional relationship satisfying a specific condition). With reference to FIG. 9, description is made by taking, as an example, a case where the print head 51C(2) is not in a positional relationship satisfying the above specific condition with respect to the print head 51K(2) and a positional shift in the Y direction is generated.

The reference mark 80 shown in FIG. 9 is a square mark which has a length in the Y direction larger than the line 71 and smaller than the printing width in the Y direction of the line pattern 70. The reference marks 80A and 80B are printed so that the positions in the Y direction of the reference positions respectively match the original points of the coordinate axes Y1 and Y2 in the Y direction.

Next, the calculation method of the positional shift $g_C$ and the positional shift amount $G_C$ of the print head 51 in the positional shift amount calculation processing will be described.

First, from the image capturing data, the printing position in the Y direction (line arrangement direction) and the printing coordinate on the coordinate axis Y1 in the image capturing data are acquired for each of the plurality of lines 71A, and the printing position in the Y direction and the printing coordinate on the coordinate axis Y2 in the image capturing data are acquired for each of the plurality of lines 71B.

Next, a straight line indicating the correspondence relationship between the printing coordinates and the printing positions acquired for each of the plurality of lines 71A and 71B is derived.

Figure 10:
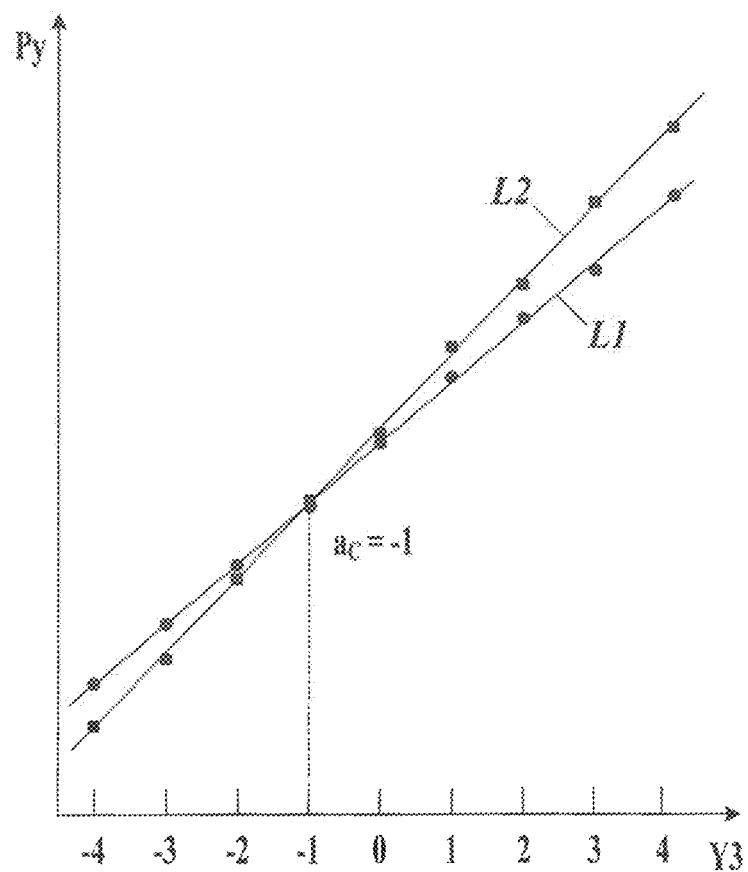
FIG. 10 This is a view for explaining straight lines showing correspondence relationships between printing coordinates and printing positions of a plurality of lines.

FIG. 10 is a view for explaining the straight lines L1 and L2 indicating the correspondence relationships between the printing coordinates and printing positions respectively for the plurality of lines 71A and 71B. The straight lines L1 and L2 respectively corresponding to the line patterns 70A and 70B are represented in an orthogonal coordinate system having two axes of a coordinate axis Y3 (third coordinate axis) indicating the coordinates on the coordinate axes Y1 and Y2 with a common coordinate axis and a coordinate axis $P_y$ (fourth coordinate axis) indicating the position in the Y direction in the image capturing data. In the orthogonal coordinate system, a plurality of points corresponding to respective plurality of lines 71A and 71B are plotted, the coordinates on the coordinate axis Y3 of the respective points indicate the printing coordinates of the lines 71, and the coordinates on the coordinate axis $P_y$ indicate the printing positions of the lines 71. The straight line L1 is an approximate straight line derived from the plurality of points corresponding to the plurality of lines 71A with the least squares method, and the straight line L2 is an approximate straight line derived from the plurality of points corresponding to the plurality of lines 71B with the least squares method.

Similarly to the calculation method of the above positional shifts $g_A$ and $g_B$, the positional shift $g_C$ is calculated by the formula $g_C=(-(r_C-1) \times a_C)$ using the coordinate $a_C$ on the coordinate axis Y3 of the intersection of the straight lines L1 and L2.

In an example of FIGS. 9 and 10, the coordinate $a_C$ of the intersection of the straight lines L1 and L2 is calculated to (−1). Since the rate $r_C$ is 1.125 (9/8), the positional shift $g_C$ on the coordinate axis Y1 is calculated to 0.125. Since the unit coordinate interval of the coordinate axis Y1 is the distance 8s, the positional shift amount $G_C$ corresponding to the positional shift $g_C$ is calculated to the distance s. Thus, it is detected that the print head 51C(2) generates a positional shift by the distance s in the Y direction with respect to the print head 51K(2).

Though FIGS. 9 and 10 show an example of calculating the positional shift amount $G_C$ of the print head 51C(2) with respect to the print head 51K(2), the positional shift amounts $G_C$ of the print heads 51M(2) and 51Y(2) are similarly calculated with respect to the black print head 51K(2) as a reference. In a case of capturing, with the line sensor 25, the test images for calculating the positional shift amounts $G_C$ of the print heads 51C(2), 51M(2) and 51Y(2) with respect to the print head 51K(2) as a reference, only the respective image capturing elements 251R, 251G and 251B in the pixels 252 of the line sensor 25 are used.

(2-4. Calculation Method of Positional Shift Amount $G_D$ for Alignment Element D)

FIG. 11 is a view showing an example of a test image used for the calculation processing of a positional shift amount $G_D$ for the alignment element D. The test image of FIG. 11 is different from FIG. 9 in the disposition of print heads 51 used for printing and the lines 71A and 71B, and common to FIG. 9 in other respects. Thus, hereinafter, the description is made centering on the difference from FIG. 9.

The test image shown in FIG. 11 includes a line pattern 70A and a reference mark 80A printed by the print head 51K(2) which is a reference for positional shift amount calculation, and a line pattern 70B and a reference mark 80B printing by the print head 51K(1) which is a test target of the positional shift.

The plurality of lines 71A included in the line pattern 70A is printed so as to have the disposition interval in the Y direction of eight printing pixels, that is, the distance 8s, and the printing coordinates on the coordinate axis Y1 are 0, ±1, ±2, ±3 and ±4. The plurality of lines 71B included in the line pattern 70B is printed so as to have the disposition interval in the Y direction of nine printing pixels, that is, the distance 9s, and the printing coordinates on the coordinate axis Y2 are 0, ±1, ±2, ±3 and ±4.

The line 71A printed at the position corresponding to the original point of the coordinate axis Y1 and the line 71B printed at the position corresponding to the original point of the coordinate axis Y2 are printed respectively by the print heads 51K(2) and 51K(1) at the ink ejection timings such that the printing positions in the Y direction are the same when alignment for the alignment element D of the print heads 51K(2) and 51K(1) is appropriate (in a case of positional relationship satisfying a specific condition). With reference to FIG. 11, description is made by taking, as an example, a case where the print head 51K(1) is not in a positional relationship satisfying the above specific condition with respect to the print head 51K(2) and a positional shift in the Y direction is generated.

The calculation method of the positional shift $g_D$ and the positional shift amount $G_D$ of the print head 51 is similar to the example of FIG. 9. That is, straight lines L1 and L2 each indicating the correspondence relationship between the printing coordinates and the printing positions acquired from image capturing data of the test image for each of the plurality of lines 71A and 71B is derived, and the positional shift $g_D$ is calculated from the coordinate $a_D$ of the intersection of the straight lines L1 and L2. The positional shift amount $G_D$ is calculated by multiplying the positional shift $g_D$ by the distance corresponding to the unit coordinate interval of the coordinate axis Y1.

Figure 12:
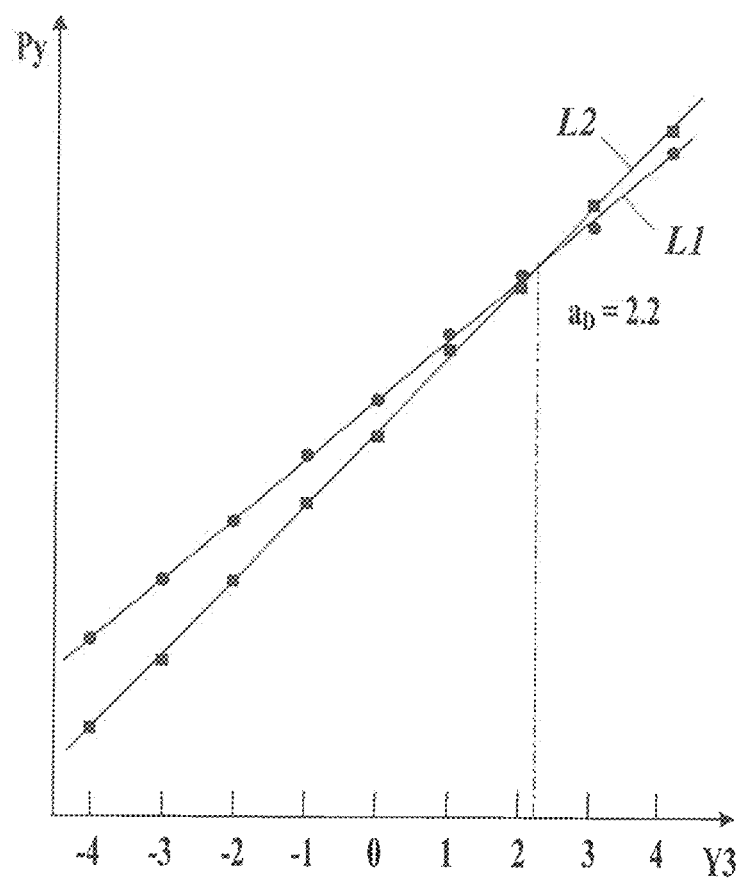
FIG. 12 This is a view for explaining straight lines showing correspondence relationships between printing coordinates and printing positions of a plurality of lines.

FIG. 12 is a view for explaining the straight lines L1 and L2 indicating the correspondence relationships between the printing coordinates and printing positions of the plurality of lines 71A and 71B.

In the example of FIGS. 11 and 12, the coordinate $a_D$ of the intersection of the straight lines L1 and L2 is calculated to 2.2. Since the rate $r_D$ is 1.125 (9/8), the positional shift $g_D$ in the coordinate axis Y1 is calculated to 0.275. Since the unit coordinate interval of the coordinate axis Y1 is the distance 8s, the positional shift amount $G_D$ corresponding to the positional shift $g_D$ is calculated to the distance 2.2s. Thus, it is detected that the print head 51K(1) generates a positional shift by the distance 2.2s in the Y direction with respect to the print head 51K(2).

Though FIGS. 11 and 12 show an example of calculating the positional shift amount $G_D$ of the print head 51K(1) with respect to the print head 51K(2), the positional shift amounts $G_D$ of the print heads 51K(0) and 51K(3) with respect to the print head 51K(2) are similarly calculated. Further, with respect to the print heads 51C(2), 51M(2) and 51Y(2) as a reference, the positional shift amounts $G_D$ of the other three print heads corresponding to the same colors of the these print heads 51 are calculated. In a case of capturing, with the line sensor 25, the test images for calculating the positional shift amounts $G_B$ of the other print heads with respect to the print heads 51C(2), 51M(2) and 51Y(2) as a reference, only the image capturing elements 251R, 251G and 251B in the pixels 252 of the line sensor 25 are respectively used. In a case of capturing, with the line sensor 25, the test images for calculating the positional shift amounts $G_D$ of the other print heads 51K with respect to the print head 51K(2) as a reference, same image capturing elements selected from the image capturing elements 251R, 251G and 251B may be used.

(2-5. Disposition Condition of Lines 71)

The lines 71 are printed so as to satisfy a disposition condition which enables accurate specification of the positions thereof from the image capturing data by the line sensor 25 with the length of luminance transition range (luminance transition distance) generated in the image capturing data by the line sensor 25. Hereinafter, the disposition condition will be described.

Figure 13A:
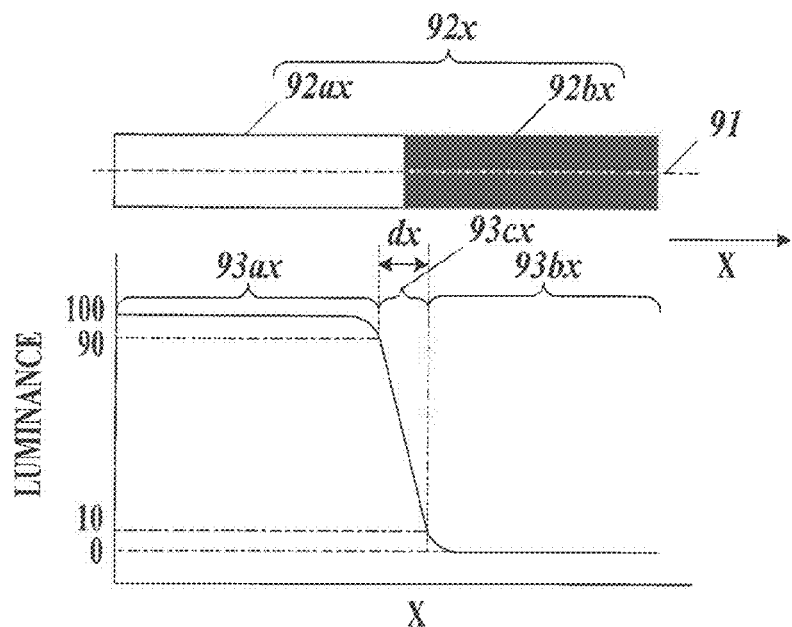
FIG. 13A This is a view for explaining a luminance transition distance of the line sensor.
Figure 13B:
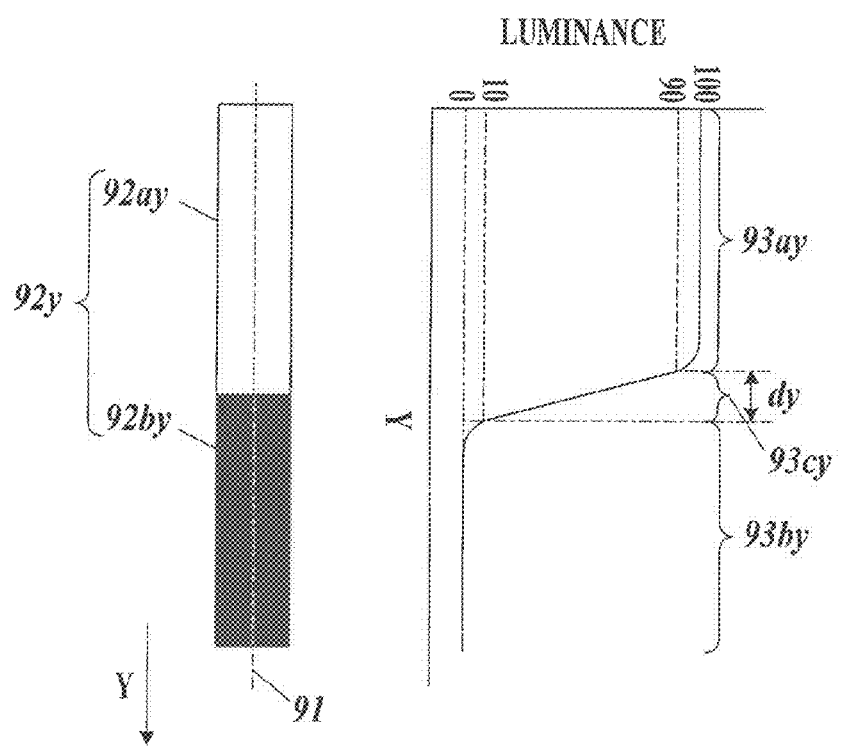
FIG. 13B This is a view for explaining a luminance transition distance of a line sensor.

FIGS. 13A and 13B are views for explaining the luminance transition distance of the line sensor 25, FIG. 13A is a view for explaining the width direction luminance transition distance dx and FIG. 13B is a view for explaining the conveyance direction luminance transition distance dy. Each of the distances (lengths) in the explanation is a value converted from the distance (number of pixels) on the image capturing data to the distance on the printing medium P.

FIG. 13A shows, in the upper section, a portion 92x including a border between a first tone image region 92ax (uniform tone image region) and a second tone image region 92bx (uniform tone image region) in the printing medium P, the first tone image region 92ax being a region where an image of a uniform tone (here, white image) is printed and the second tone image region 92bx being a region where an image of a uniform tone (here, black image) adjacent to the first tone image region 92ax in the X direction and having a different luminance from that of the first tone image region 92ax is printed. FIG. 13A shows, in the lower section, a graph representing the luminance at the position of an analysis line 91 in the image capturing data acquired by capturing the portion 92x of the printing medium P with the line sensor 25. In the image capturing data of the line sensor 25, the range 93ax indicating the luminance of the first tone image region 92a is separated from the range 93bx indicating the luminance of the second tone image region 92bx by a distance dx (width direction luminance transition distance). In the range corresponding to the distance dx (hereinafter, described as the width direction luminance transition range 93cx), the luminance continuously changes between the luminance corresponding to the first tone image region 92*ax* and the luminance corresponding to the second tone image region 92*bx*. Here, the range 93*ax* is a region indicating the luminance of 90 or more when the luminance of the first tone image region 92*ax* is 100 and the luminance of the second tone image region 92*bx* is 0, and the range 93*bx* is similarly a region indicating the luminance of 10 or less.

FIG. 13B shows, in the left side, a portion 92*y* including a border between a first tone image region 92*ay* (uniform tone image region) and a second tone image region 92*by* (uniform tone image region) which is adjacent to the first tone image region 92*ay* in −Y direction. FIG. 13B shows, in the right side, a graph representing the luminance at the position of an analysis line 91 in the image capturing data acquired by capturing the portion 92*y* of the printing medium P with the line sensor 25. In the image capturing data of the line sensor 25, the range 93*ay* indicating the luminance of the first tone image region 92*ay* is separated from the range 93*by* indicating the luminance of the second tone image region 92*by* by a distance dy (conveyance direction luminance transition distance). In the region corresponding to the distance dy (hereinafter, described as the conveyance direction luminance transition range 93*cy*), the luminance continuously changes between the luminance corresponding to the first tone image region 92*ay* and the luminance corresponding to the second tone image region 92*by*. Here, the range 93*ay* is a region indicating the luminance of 90 or more when the luminance of the first tone image region 92*ay* is 100 and the luminance of the second tone image region 92*by* is 0, and the range 93*by* is similarly a region indicating the luminance of 10 or less.

The method for determining the border between the ranges 93*ax* and 93*bx* and the width direction luminance transition range 93*cx* and the border between the ranges 93*ay* and 93*by* and the conveyance direction luminance transition range 93*cy* is not limited to the above method, and the borders may be determined by other methods as long as the ranges 93*ax* and 93*bx* respectively indicate the luminance of the first tone image region 92*ax* and the second tone image region 92*bx*, and the ranges 93*ay* and the 93*by* respectively indicate the luminance of the first tone image region 92*ay* and the second tone image region 92*by*.

The first tone image regions 92*ax* and 92*ay* can be regions where printing is not performed to the printing medium P. The second tone image regions 92*bx* and 92*by* are not limited to the black image and may be a region where a solid pattern is printed with same ink as ink used for printing the line patterns 70 and the reference marks 80 to the printing medium P.

In such a way, the image capturing data of the line sensor 25 requires the distance dx for response to the luminance change in the width direction of the image printed on the printing medium P and requires the distance dy for response to the luminance change in the conveyance direction. The amounts of the distances dx and dy are influenced by the setting state and the property of lens focusing the incident light to the line sensor 25 to the image capturing element 251, the incident amount of scattered light from positions other than the image capturing target position into the image capturing elements 251, and such like. The amount of the distance dy is also influenced by the conveyance speed of the printing medium P at the time of image capturing and becomes larger as the conveyance speed is larger.

Figure 14A:
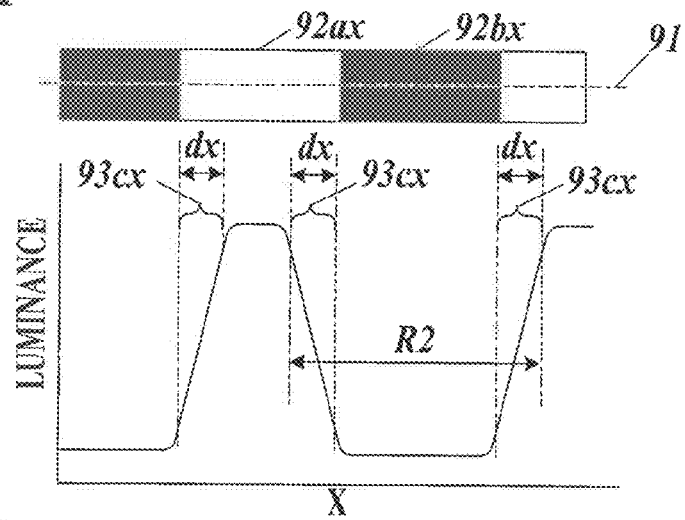
FIG. 14A This is a view for explaining a manner in which a width direction luminance transition range is generated.
Figure 14B:
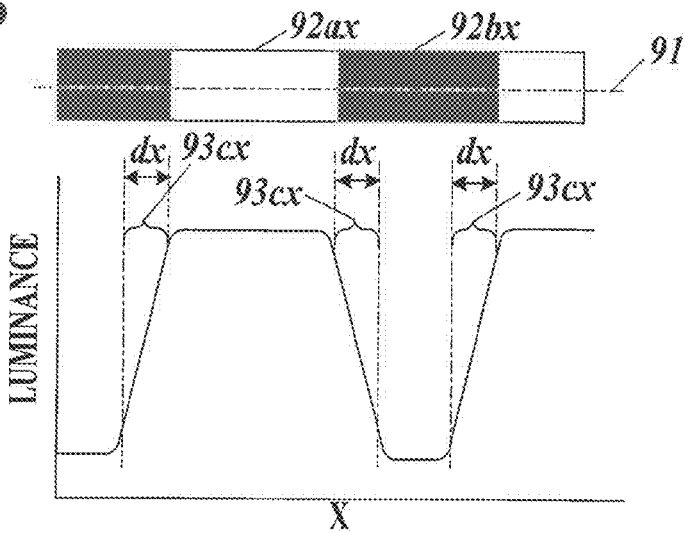
FIG. 14B This is a view for explaining a manner in which a width direction luminance transition range is generated.
Figure 14C:
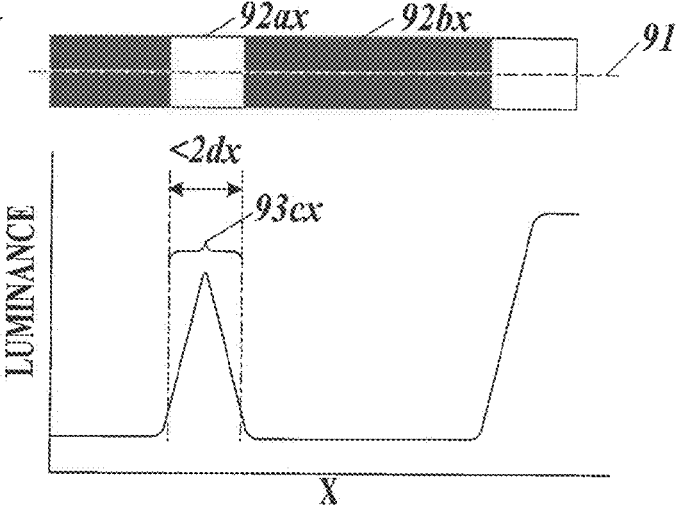
FIG. 14C This is a view for explaining a manner in which a width direction luminance transition range is generated.

Each of FIGS. 14A to 14C is a view for explaining the manner in which the width direction luminance transition range 93*cx* is generated.

FIG. 14A shows luminance of the second tone image region 92*bx* in the second tone image region 92*bx*, and shows an example in which the width direction luminance transition range 93*cx* of the distance dx is generated from the border between the first tone image region 92*ax* and the second tone image region 92*bx* toward the first tone image region 92*ax*.

On the other hand, FIG. 14B shows luminance of the first tone image region 92*ax* in the first tone image region 92*ax*, and shows an example in which the width direction luminance transition range 93*cx* of the distance dx is generated from the border between the first tone image region 92*ax* and the second tone image region 92*bx* toward the second tone image region 92*bx*.

In such a way, the width direction luminance transition range 93*cx* can be generated in any manner of FIGS. 14A and 14B and an intermediate manner thereof depending on the disposition of lens of line sensor 25, the incident situation of diffusion light and such like.

In the manner indicating FIG. 14A, when the image capturing data is analyzed at the position of the analysis line 91 to specify the positions in the X direction of the lines 71 and the reference marks 80 as the second tone image region 92*bx*, the centroid (position in the X direction equally dividing the integral value of the luminance decrease amount from the luminance 100 of each point in the range R2) of data group is estimated to be the central position in the X direction of the second tone image region 92*bx*, the data group being included in the region (range R2 of FIG. 14A) having the luminance of 90 or less when the first tone image region 92*ax* is 100 and the second tone image region 92*bx* is 0. Here, as shown in FIG. 14C, when the width of the first tone image region 92*ax* is smaller than the distance 2dx, two width direction luminance transition ranges 93*cx* generated in the first tone image region 92*ax* overlap each other, and the luminance data of the first tone image region 92*ax* does not reach the original luminance of the first tone image region 92*ax*. Thus, as shown in FIG. 14C, for example, when the width of one first tone image region 92*ax* adjacent to one second tone image region 92*bx* is smaller than the distance 2dx, the data group used for specifying the position of the second tone image region 92*bx* is in an asymmetrical form in the X direction, and there is generated defect that it is not possible to accurately specify the position of the second tone image region 92*bx*. Thus, in the manner shown in FIG. 14A, it is preferable that the width of the first tone image region 92*ax* (that is, interval of adjacent second tone image regions 92*bx*) is the distance 2dx or more.

Though FIGS. 14A to 14C show the manners in which the width direction luminance transition range 93*cx* is generated, the same applies to the manners in which the conveyance direction luminance transition range 93*cy* is generated.

The lines 71A and 71B shown in FIGS. 5 and 7 are printed so that the interval of lines 71 adjacent in the X direction is twice or more the distance (width direction luminance transition distance dx) on the printing medium P corresponding to the length in the width direction of the width direction luminance transition range 93*cx* so as not to generate defect regardless of the manner in which the width direction luminance transition range 93*cx* is generated. The lines 71A and 71B shown in FIGS. 9 and 11 are printed so that the interval of lines adjacent in the Y direction is twice or more the distance (conveyance direction luminance transition distance dy) on the printing medium P corresponding to the length in the conveyance direction of the conveyance direction luminance transition range 93*cy* so as not to generate defect regardless of the manner in which the conveyance direction luminance transition range 93*cy* is generated.

In addition to the above disposition condition, there may be determined the disposition condition in relation to the disposition interval in the X direction of the pixels 252 of the line sensor 25. For example, in a case of printing a plurality of lines 71 parallel to the Y direction, the interval in the X direction of the lines 71 is set to be three times or more and less than 30 times the disposition interval in the X direction of the pixels 252 of the line sensor 25. This range may be changed on the basis of the image capturing resolution of the line sensor 25, the printing resolution of the inkjet printing apparatus 1 and such like. The lower limit of this range is set within a range enabling separating the adjacent lines 71 from the image capturing data by the line sensor 25 and reading the lines 71, and the upper limit is set within a rage such that the number of lines 71 corresponding to the points for deriving the straight lines L1 and L2 is a predetermined number or more. Here, since the number of points used for derivation of the straight lines L1 and L2 is larger as the predetermined number is larger, the calculation accuracy of the positional shift $g_i$ (i is A, B, C or D) and the positional shift amount $G_i$ is improved. Thus, the predetermined number is set to be a value which is 2 or more and corresponding to the required calculation accuracy of positional shift $g_i$ and the positional shift amount $G_i$.

(2-6. Control Procedure of Positional Shift Amount Calculation Processing)

Next, the entire operation of the positional shift amount calculation processing using the above test image will be described.

FIG. 15 is a flow chart showing a control procedure of the positional shift amount calculation processing.

The CPU 41 controls the conveyance drum 21 holding the printing medium P and the print heads 51 of the head units 50 and controls a plurality of predetermined printing elements 52 of the print heads 51 to eject ink onto the printing medium P conveyed by the conveyance drum 21 to print, on the printing medium P, a test image including the line patterns 70 and reference marks 80 used in the calculation processing of all the positional shift amounts $G_i$ for any of the alignment elements A to D (step S11). For example, in a case of calculating the positional shift amounts $G_A$ for the alignment element A, all the line patterns 70 and the reference marks 80 for calculating the positional shift amounts $G_A$ of the print heads 51C(2), 51M(2) and 51Y(2) with respect to the print head 51K(2) as a reference are printed on the printing medium P.

The CPU 41 controls the line sensor 25 to capture the test image including the line patterns 70 and the reference marks 80 printed on the printing medium P while rotating the conveyance drum 21 to convey the printing medium P (step S12). The CPU 41 outputs two-dimensional image capturing data of the test image from the line sensor 25 and stores the acquired image capturing data in the storage section 44.

In step S12, image capturing may be performed for the entire test image or may be performed for only a part (reading line) of the test image including the positions on the analysis line for which the luminance is acquired to be analyzed.

The printing medium P having the test image captured is conveyed to the sheet ejection section 30 under control by the CPU 41.

The CPU 41 derives, from the image capturing data of the test image acquired in step S12, approximate straight lines of straight lines L1 and L2 indicating the correspondence relationships between the printing coordinates and the printing positions for the respective line patterns 70A and 70B of any one set of print heads 51 for which the positional shift amount $G_i$ is calculated (step S13; printing coordinate acquisition step, printing position acquisition step and positional shift amount calculation step).

Specifically, the CPU 41 acquires luminance data on the analysis line set in the X direction (Y direction) at the position crossing the reference marks 80A and 80B from the image capturing data, acquires the positions in the X direction (Y direction) of the reference positions of the reference marks 80A and 80B and stores them in the RAM 42. The CPU 41 acquires luminance data on the analysis line set in the X direction (Y direction) at the positions crossing the line patterns 70A and 70B, acquires the printing positions in the X direction (Y direction) of the lines 71A and 71B and stores them in the RAM 42. The acquisition of the luminance data may be performed in an analysis region having the width of a plurality of pixels in the Y direction (X direction) instead of the above analysis line having the width in the Y direction (X direction) of a single pixel.

Next, the CPU 41 specifies the line 71A having the same position in the X direction (Y direction) as the reference position of the reference mark 80A, acquires the printing coordinate on the coordinate axis X1 (Y1) of the line 71A as 0 and stores the coordinate in the RAM 42. The CPU 41 acquires the printing coordinates on the coordinate axis X1 (Y1) of the lines 71A arranged in +X direction (+Y direction) with respect to the above line 71A as 1, 2, 3 and 4 in the order, acquires the printing coordinates on the coordinate axis X1 (Y1) of the lines 71A arranged in −X direction (−Y direction) as −1, −2, −3 and −4 in the order, and stores the printing coordinates in the RAM 42.

Similarly, the CPU 41 specifies the line 71B having the same position in the X direction (Y direction) as the reference position of the reference mark 80B, acquires the printing coordinate on the coordinate axis X2 (Y2) of the line 71B as 0 and stores the coordinate in the RAM 42. The CPU 41 acquires the printing coordinates on the coordinate axis X2 (Y2) of the lines 71B arranged in +X direction (+Y direction) with respect to the above line 71B as 1, 2, 3 and 4 in the order, acquires the printing coordinates on the coordinate axis X2 (Y2) of the lines 71B arranged in −X direction (−Y direction) as −1, −2, −3 and −4 in the order, and stores the printing coordinates in the RAM 42.

Next, the CPU 41 derives the straight lines L1 and L2 in the orthogonal coordinate system having two axes of the coordinate axes X3 (Y3) and Px (Py) indicating the relationships between the printing coordinates and the printing positions by the least square method, and stores the values of parameters (slope and intercept) representing the straight lines L1 and L2 in the RAM 42.

The CPU 41 calculates the coordinate $a_i$ on the coordinate axis X3 (Y3) of intersection of the straight lines L1 and L2 derived in step S13, and the positional shift $g_i$ with a unit of the unit coordinate interval of the coordinate axis X1 (Y1) of print head 51 is calculated by the formula $g_i=(-(r_i-1)\times a_i)$ from the coordinate $a_i$ and the rate $r_i$ stored in the RAM 42. The CPU 41 calculates the positional shift amount $G_i$ by acquiring the distance corresponding to the unit coordinate interval in the coordinate axis X1 (Y1) from the RAM 42 and multiplying the positional shift $g_i$ with the acquired distance (step S14; positional shift amount calculation step). The CPU 41 stores the values of the calculated coordinate $a_i$, positional shift $g_i$ and positional shift amount $G_i$ in the RAM 42.

The CPU 41 determines whether the positional shift amount $G_i$ was calculated for all the print heads 51 which are the test target regarding the alignment element targeted by the test image printed in step S11 (step S15). If it is determined that the positional shift amount $G_i$ was not calculated for any of the print heads 51 (step S15: NO), the CPU 41 proceeds to step S13, and executes steps S13 and S14 to calculate the positional shift amount $G_i$ for the print head 51 of the test target for which the positional shift amount $G_i$ is not calculated.

If it is determined that the positional shift amount $G_i$ was calculated for all the print heads 51 which are the test target (step S15; YES), the CPU 41 determines whether the calculation of the positional shift amounts $G_i$ regarding all the alignment elements A to D is completed (step S16). If it is determined that the calculation of the positional shift amounts $G_i$ is not completed for any of the alignment elements (step S16; NO), the CPU 41 proceeds to step S11, and executes steps S11 to S14 to calculate the positional shift amounts $G_i$ for the alignment element for which the positional shift amounts $G_i$ are not calculated.

If it is determined that calculation of the positional shift amounts $G_i$ for all the alignment elements A to D is completed (step S16; YES), the CPU 41 ends the positional shift amount calculation processing.

Though the above description is made for an example in which steps S11 and S12 are individually performed for each of the alignment elements A to D, processing for all the alignment elements A to D may be performed in each of steps S11 and S12 to omit step S16.

(2-7. Control Procedure of Image Printing Processing)

Next, image printing processing will be described.

Figure 16:
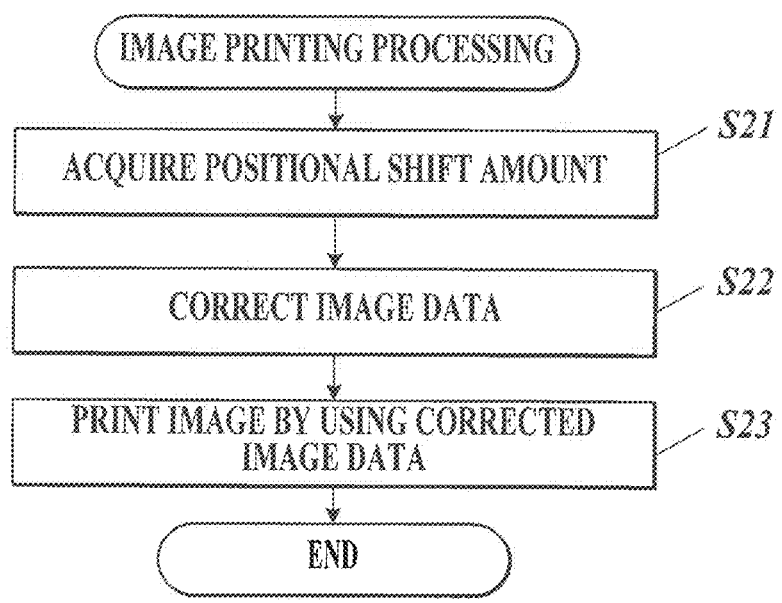
FIG. 16 This is a flow chart showing a control procedure of image printing processing.

FIG. 16 is a flowchart showing a control procedure of the image printing processing.

The CPU 41 acquires positional shift amounts $G_i$ (positional shift amounts $G_A$, $G_B$, $G_C$, and $G_D$) for each of the print heads 51 that were calculated in the positional shift amount calculation processing and stored in the RAM 42 (step S21).

The CPU 41 corrects image data of an image to be printed on the printing medium P on the basis of the positional shift amounts $G_A$ and $G_B$ regarding the X direction among the positional shift amounts $G_i$ acquired in step S21 (step S22).

Specifically, the CPU 41 acquires single color image data which is formed of only each color component corresponding to yellow, magenta, cyan and black forming the image data. The CPU 41 inserts data corresponding to white into the end in the +X direction or the end in −X direction of each single color image data on the basis of the positional shift amount $G_A$ for the alignment element A of each of the print heads 51C(2), 51M(2) and 51Y(2), and shifts the single color image data in −X direction or +X direction by the amount compensating the positional shift amounts $G_A$ in the X direction of each of these print heads 51.

The CPU 41 then changes the ranges in the single color image data which are to be printed by the respective four print heads 51 corresponding to the color of the single color image data on the basis of the positional shift amounts $G_B$ for the alignment element B of the respective print heads 51 calculated with respect to each of the print heads 51K(2), 51C(2), 51M(2) and 51Y(2) as a reference.

The CPU 41 stores single color images to which the correction was performed in the storage section 44. In a case where either or both of the positional shift amounts $G_A$ and $G_B$ of each of the print heads 51 is 0, the CPU 41 ends step S22 without performing the correction corresponding to the positional shift amount(s) $G_A$ and/or $G_B$ being 0.

The CPU 41 controls the conveyance drum 21 to convey the printing medium P, and prints an image on the printing medium P by controlling the print head control circuit 61 to output the corrected image data which was stored in the storage section 44 in step S22 to each of the print heads 51 (step S23).

In step S23, image printing is performed after adjusting the ink ejection timing of each of the print heads 51 on the basis of the positional shift amounts $G_C$ and $G_D$ for the alignment elements C and D. Specifically, the CPU 41 calculates a cumulative positional shift amount in the Y direction of each of the print heads 51 with respect to the print head 51K(2) as a reference from the positional shift amounts $G_C$ in the Y direction of the print heads 51C(2), 51M(2) and 51Y(2) with respect to the print head 51K(2) as a reference and the positional shift amounts $G_D$ of the other three print heads corresponding to the same color as the print head 51 with reference to each of the print heads 51K(2), 51C(2), 51M(2) and 51Y(2) as a reference. Then, the CPU 41 prints an image at an appropriate position by compensating the cumulative positional shift amount by accelerating or delaying, for the amount corresponding to the calculated cumulative positional shift amount, the predetermined ink ejection timing which is set for each of the print heads 51 as a timing for a case where the relative position in the Y direction with respect to the print head 51K(2) is a predetermined value.

The CPU 41 prints an image without correcting the ink ejection timing according to a print head 51 in a case where both of the positional shift amounts $G_C$ and $G_D$ of the print head 51 are 0.

When the image is printed on the printing medium P, the CPU 41 ends the image printing processing.

As described above, an inkjet printing apparatus 1 as an information processing device in the embodiment performs processing of specifying a positional relationship between a print head 51 as a reference and a print head 51 as a test target based on image capturing data of a test image that is printed on a printing medium P by the print head 51 as a reference and the print head 51 as a test target in each of which a plurality of printing elements is arranged, the test image including a plurality of lines 71A which are printed by the print head 51 as a reference so as to have printing positions different from each other in an X direction (Y direction) on the printing medium P and a plurality of lines 71B which are printed by the print head 51 as a test target so as to have printing positions different from each other in the X direction (Y direction) on the printing medium P, and the CPU 41 acquires a printing coordinate on a coordinate axis X1 (Y1) on the printing medium P for each of the plurality of lines 71A and acquires a printing coordinate on a coordinate axis X2 (Y2) for each of the plurality of lines 71B, the first coordinate axis being an axis in which a predetermined first unit coordinate interval is determined in the X direction (Y direction), and the second coordinate axis being an axis in which a second unit coordinate interval different from the first unit coordinate interval is determined on a coordinate axis X1(Y1) and a reference position when the print head 51 as a reference and the print head 51 as a test target are disposed in a specific positional relationship in the X direction (Y direction) is in a predetermined reference relative positional relationship in the X direction (Y direction) with a reference position of the coordinate axis X1(Y1); acquires a printing position in the X direction (Y direction) of each of the plurality of lines 71A and 71B in the image capturing data; and specifies a relative positional relationship in the X direction (Y direction) between the reference position of the coordinate axis X1(Y1) and the reference position of the coordinate axis X2(Y2) from a correspondence relationship between the acquired printing coordinate and the printing position, and calculates a value (positional shift $g_i$) corresponding to a positional shift amount $G_i$ from the specific positional relationship in the X direction (Y direction) of the print head 51 as a test target to the print head 51 as a reference based on the specified relative positional relationship and the predetermined reference relative positional relationship. Thus, it is possible to detect the positional shift $g_i$ and positional shift amount $G_i$ for the print head 51 from the image capturing data of the lines 71A and 71B easily and with high accuracy. Since the positional shift $g_i$ is calculated on the basis of the correspondence relationships between the printing coordinates and the printing positions of the lines 71A and 71B, it is possible to calculate the positional shift $g_i$ and positional shift amount $G_i$ with high accuracy. Since the distance corresponding to the length on the image capturing data is not used in the calculation of positional shift $g_i$, the positional shift $g_i$ does not include error caused by calibration accuracy of the resolution of line sensor 25. Thus, it is possible to calculate the positional shift $g_i$ and positional shift amount $G_i$ of print head 51 with high accuracy regardless of the calibration accuracy of resolution of the line sensor 25.

The predetermined reference relative positional relationship is a positional relationship in which positions in the X direction (Y direction) of the reference position (original point) of the coordinate axis X1 (Y1) and the reference position (original point) of the coordinate axis X2(Y2) match, and the CPU 41 specifies a positional relationship in the X direction (Y direction) between the coordinate axis X1(Y1) and the coordinate axis X2(Y2) based on a same coordinate $a_i$ at a position in the X direction (Y direction) where the coordinate axis X1(Y1) and the coordinate axis X2(Y2) have the same coordinate. Thus, it is possible to more easily calculate the positional shift $g_i$ and positional shift amount $G_i$ of print head 51.

In a orthogonal coordinate system which has two axes of a coordinate axis X3(Y3) indicating the printing coordinates in the coordinate axis X1(Y1) and the coordinate axis X2(Y2) with a common coordinate axis and a coordinate axis Px(Py) indicating the printing positions, the CPU 41 calculates a first approximate straight line (straight line L1) of a plurality of points respectively corresponding to combinations of the printing coordinates and the printing positions of the plurality of lines 71A and a second approximate straight line (straight line L2) of a plurality of points respectively corresponding to combinations of the printing coordinates and the printing positions of the plurality of lines 71B, and acquires the coordinate $a_i$ from a coordinate on the coordinate axis X3 (Y3) of an intersection of the first approximate straight line and the second approximate straight line. Thus, it is possible to easily calculate the positional shift $g_i$ and positional shift amount $G_i$ by data processing on the basis of image capturing data.

The test image includes a reference mark 80A which is printed by the print head 51 as a reference in a predetermined positional relationship with the plurality of lines 71A and a reference mark 80B which is printed by the print head 51 as a test target in a predetermined positional relationship with the plurality of lines 71B, and the CPU 41 acquires the printing coordinate on the coordinate axis X1 (Y1) of at least one of the plurality of lines 71A based on a positional relationship in the X direction (Y direction) with the reference mark 80A, and acquires the printing coordinate on the coordinate axis X2(Y2) of at least one of the plurality of lines 71B based on a positional relationship in the X direction (Y direction) with the reference mark 80B. Thus, it is possible to easily acquire the printing coordinate of line 71 even when the line pattern 70 includes multiple lines 71.

Each of the plurality of lines 71A and the plurality of lines 71B is three lines 71 or more which are printed at an equal interval. Thus, it is possible to obtain, on the image capturing data, an approximate position where the coordinate axes X1 and X2 have a same coordinate, and easily calculate the coordinate $a_i$.

The CPU 41 acquires values corresponding to the numbers indicating arrangement orders of the plurality of lines 71A as the printing coordinates of the plurality of lines 71A, and acquires values corresponding to the numbers indicating arrangement orders of the plurality of lines 71B as the printing coordinates of the plurality of lines 71B. Thus, it is possible to easily acquire the printing coordinate of line 71.

The CPU 41 sets printing coordinate of one of the plurality of lines 71A to the original point of the coordinate axis X1 (Y1) and sets printing coordinate of one of the plurality of lines 71B to the original point of the coordinate axis X2 (Y2). Thus, it is possible to indicate, on the image capturing data, the positional shift of the original points of the coordinate axes X1 (Y1) and X2 (Y2) by the positional relationship of a pair of lines 71 corresponding to the original points.

The test image is formed by printing the plurality of lines 71A with printing elements 52 disposed at positions which are different in a width direction orthogonal to the conveyance direction among the plurality of printing elements 52 of the print head 51 as a reference and printing the plurality of lines 71B with printing elements 52 disposed at positions which are different in the width direction among the plurality of printing elements 52 of the print head as the test target while the printing medium P is moved with respect to the print head 51 as a reference and the print head 51 as a test target by a conveyance drum 21 which moves the printing medium P in a conveyance direction, and the CPU 41 calculates the positional shift $g_i$ corresponding to a positional shift amount $G_i$ in the width direction of the print head 51 as a test target to the print head 51 as a reference. Thus, it is possible to calculate the positional shift $g_i$ and positional shift amount $G_i$ in the width direction of the print head 51.

The test image is formed by printing the plurality of lines 71A with printing elements 52 in a positional relationship of printing a continuous line among the plurality of printing elements 52 of the print head 52 as a reference and printing the plurality of lines 71B with printing elements 52 in a positional relationship of printing a continuous line among the plurality of printing elements 52 of the print head 51 as a test target while the printing medium P is moved with respect to the print head 51 as a reference and the print head 51 as a test target by a conveyance drum 21 which moves the printing medium P in a conveyance direction, and the CPU 41 calculates a positional shift $g_i$ corresponding to a positional shift amount $G_i$ in the conveyance direction of the print head 51 as a test target to the print head 51 as a reference. Thus, it is possible to calculate the positional shift $g_i$ and positional shift amount $G_i$ in the conveyance direction of the print head 51.

The CPU 41 corrects image data of an image printed on the printing medium P by the print head 51 as a reference and the print head 51 as a test target based on the calculated positional shift $g_i$ corresponding to the positional shift amount $G_i$ or the positional shift amount $G_i$. Thus, image data is corrected so as to compensate the positional shift of the print head 51, and normal image printing can be performed by the inkjet printing apparatus 1.

The inkjet printing apparatus 1 includes the print head 51 as a reference and a print head 51 as a test target in addition to the configuration as the information processing device. Thus, it is possible to calculate the positional shift $g_i$ and positional shift amount $G_i$ of the print head 51 included in the inkjet printing apparatus 1 by the inkjet printing apparatus 1.

The inkjet printing apparatus 1 includes the print head 51 as a reference and a print head 51 as a test target in addition to the configuration as the information processing device, and the CPU 41 corrects the timing when printing is performed on the printing medium P by each of the print heads 51 based on the calculated positional shift $g_i$ corresponding to the positional shift amount $G_i$ or the positional shift amount $G_i$. Thus, the timing to perform printing by each of the print heads 51 is corrected so as to compensate the positional shift amount $G_i$ of a print head 51 and normal image printing can be performed by the inkjet printing apparatus 1.

The inkjet printing apparatus 1 includes the print head 51 as a reference and a print head 51 as a test target in addition to the configuration as the information processing device, and when a width direction luminance transition range 93$cx$ of changing luminance between luminances of two uniform tone image regions is generated in image capturing data obtained by capturing the two uniform tone image regions (first tone image region 92$ax$ and the second tone image region 92$bx$) by a line sensor 25 that captures the test image, the two uniform tone image regions being adjacent in the width direction and having different luminances, the CPU 41 controls the print head 51 as a reference to print the plurality of lines 71A so that an interval in the width direction of the adjacent plurality of lines 71A is twice or more a distance on the printing medium P corresponding to a length in the width direction of the width direction luminance transition range 93$cx$, and controls the print head as a test target to print the plurality of lines 71B so that an interval in the width direction of the adjacent plurality of lines 71B is twice or more a distance on the printing medium P corresponding to a length in the width direction of the width direction luminance transition range 93$cx$. Thus, it is possible to suppress the defect that the luminance distribution is asymmetrical and the accuracy of specified position is decreased when the position in the width direction of the line 71 is specified.

The inkjet printing apparatus 1 includes the print head 51 as a reference and a print head 51 as a test target in addition to the configuration as the information processing device, and when a conveyance direction luminance transition range 93$cy$ of changing a luminance between luminances of two uniform tone image regions (first tone image region 92$ay$ and second tone image region 92$by$) is generated in image capturing data obtained by capturing the two uniform tone image regions by a line sensor 25 that captures the test image, the two uniform tone image regions being adjacent in the conveyance direction and having different luminances, the CPU 41 controls the print head as a reference to print the plurality of lines 71A so that an interval in the conveyance direction of the adjacent plurality of lines 71A is twice or more a distance on the printing medium P corresponding to a length in the conveyance direction of the conveyance direction luminance transition range 93$cy$, and controls the print head 51 as a test target to print the plurality of lines 71B so that an interval in the conveyance direction of the adjacent plurality of lines 71B is twice or more a distance on the printing medium P corresponding to a length in the conveyance direction of the conveyance direction luminance transition range 93$cy$. Thus, it is possible to suppress the defect that the luminance distribution is asymmetrical and the accuracy of specified position is decreased when the position in the conveyance direction of the line 71 is specified.

The inkjet printing apparatus 1 includes the print head 51 as a reference, a print head 51 as a test target, a conveyance drum 21 and a line sensor 25 which captures the test image printed on the printing medium P by the plurality of image capturing elements 251 that are arranged over a printing range of the test image on the printing medium P in the width direction, and outputs the image capturing data, in addition to the configuration as the information processing device, and the CPU 41 controls the print head 51 as a reference to print the plurality of lines 71A and controls the print head 51 as a test target to print the plurality of lines 71B so that an interval of adjacent lines is three times or more and less than 30 times an disposition interval in the width direction of the plurality of image capturing elements 251. Thus, it is possible to separate and read adjacent lines 71 from the image capturing data by the line sensor 25. It is also possible to print, on the printing medium P, the required number of lines 71 for deriving the coordinate $a_i$ with high accuracy.

Since the line pattern 70A does not include a line having a positive coordinate on the coordinate axis X1 and the line pattern 70B does not include a line having a negative coordinate on the coordinate axis X2 in the test image shown in FIG. 7, it is not possible to visually specify the position having the same coordinate on the coordinate axes X1 and X2. However, according to the embodiment, it is possible to easily calculate the positional shift $g_i$ and positional shift amount $G_i$ from the coordinate $a_i$ of the intersection of the straight lines L1 and L2 indicating the correspondence relationships between the printing coordinates and the printing positions of lines 71.

In a case of capturing, with the line sensor 25, the test image for calculating the positional shifts $g_i$ and positional shift amounts $G_i$ of the print heads 51C(2), 51M(2) and 51Y(2) with respect to the print head 51K(2) as a reference, only the image capturing elements 251R, 251G and 251B are respectively used. In a case of capturing, with the line sensor 25, the test image for calculating the positional shifts $g_i$ and positional shift amounts $G_i$ of the other print heads 51 corresponding to the same colors with respect to the print heads 51C(2), 51M(2) and 51Y(2) as a reference, only the image capturing elements 251R, 251G and 251B among the pixels 252 in the line sensor 25 are respectively used. Thus, positional shifts $g_i$ and positional shift amounts $G_i$, which are direct or indirect via other print heads 51, of the respective print heads 51C, 51M and 51Y with respect to the print head 51K(2) as a reference are calculated on the basis of the image capturing data captured by using only the image capturing elements 251R, 251B and 251B, respectively. Thus, the image capturing element 251 of the same resolution is used for each capturing of the test image, and it is possible to suppress the generation of error in the positional shift $g_i$ and positional shift amount $G_i$ caused by the difference in resolution between the image capturing elements 251R, 251B and 251B.

Modification Example 1

Next, a modification example 1 of the above embodiment will be described. The modification example 1 may be combined with after-mentioned other modification examples.

The modification example 1 is an example of a case where the unit coordinate interval of the coordinate axis X1 is larger than the unit coordinate interval of the coordinate axis X2. Since the modification example 1 is similar to the embodiment in other respects, hereinafter, difference from the embodiment will be described.

Figure 17:
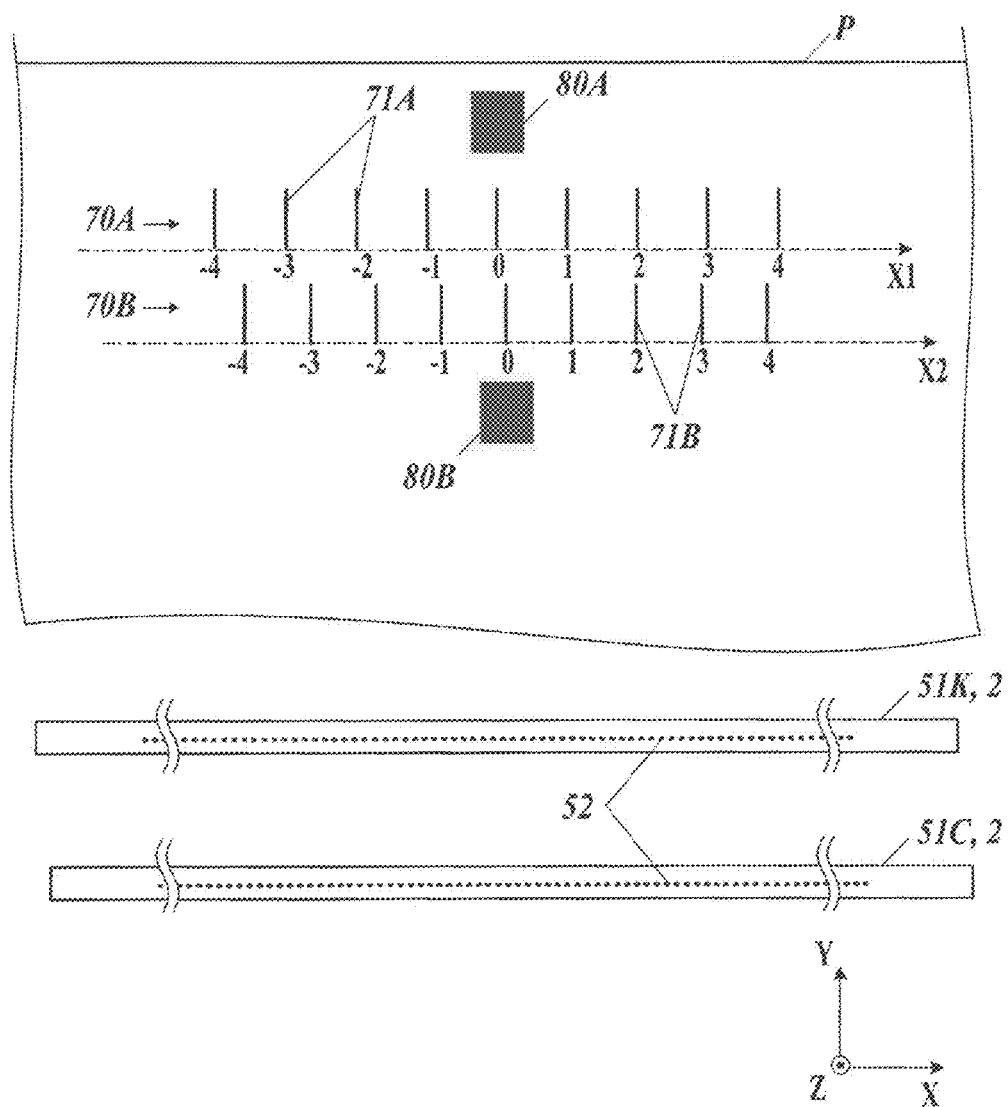
FIG. 17 This is a view showing an example of a test image used in calculation processing of a positional shift amount according to a modification example 1.

FIG. 17 is a view showing an example of a test image used in calculation processing of the positional shift amount $G_i$ according to the modification example 1. Here, there is shown a test image used in the calculation processing of the positional shift amount $G_A$ for the alignment element A. The test image in FIG. 17 is printed by the print heads 51K(2) and 51C(2) in a same positional relationship as FIG. 5.

The plurality of lines 71A included in the line pattern 70A in FIG. 17 is printed so that the disposition interval in the X direction is the distance 8s, and the plurality of lines 71B included in the line pattern 70B is printed so that the disposition interval in the X direction is the distance 7s. Accordingly, the unit coordinate intervals in the coordinate axes X1 and X2 are 8s and 7s, respectively, and the rate $r_A$ of the unit coordinate interval of the coordinate axis X2 to the unit coordinate interval of the coordinate axis X1 to is 7/8.

Figure 18:
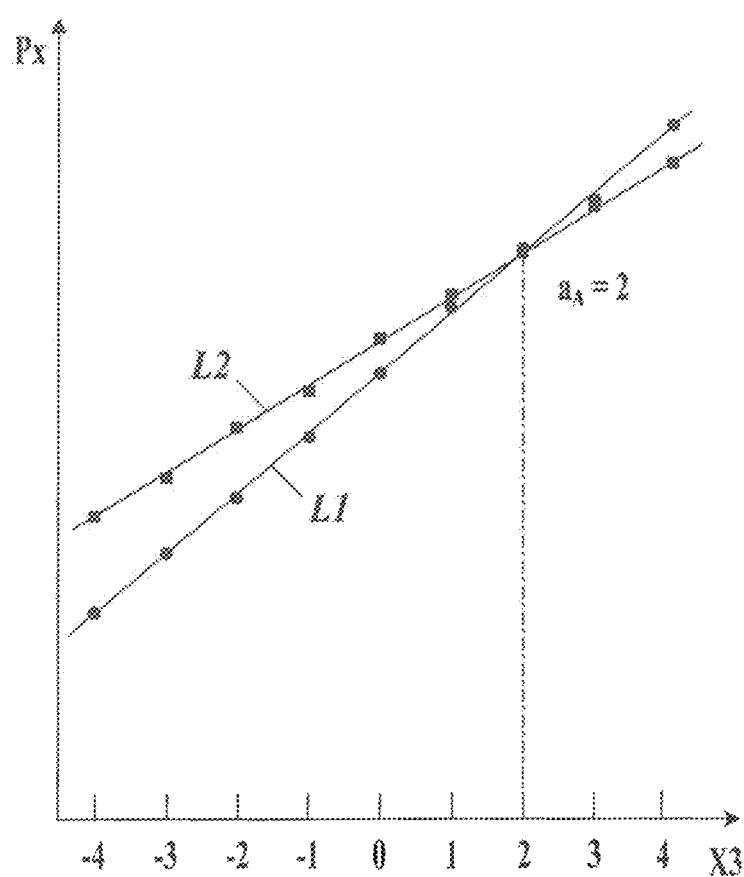
FIG. 18 This is a view for explaining straight lines showing correspondence relationships between printing coordinates and printing positions of a plurality of lines according to the modification example 1.

FIG. 18 is a view for explaining straight lines L1 and L2 indicating the correspondence relationships between the printing coordinates and the printing positions of the plurality of lines 71A and 71B according to the modification example 1.

In the example of FIG. 18, the coordinate $a_A$ of the intersection of the straight lines L1 and L2 is calculated to 2. Since the rate $r_A$ is 0.875 (7/8), positional shift $g_A$ in the coordinate axis X1 is calculated to be 0.25 similarly to the embodiment, and the positional shift amount $G_A$ is calculated to the distance 2s.

In such a way, even when the unit coordinate interval of the coordinate axis X1 is larger than the unit coordinate interval of the coordinate axis X2, the positional shift amount of a print head 51 can be calculated by a same algorithm as the embodiment. Though the above is calculation processing of the positional shift amount $G_A$ for the alignment element A, the modification example 1 can be applied to calculation processing of positional shift amounts $G_i$ for the other alignment elements B to D.

Modification Example 2

Next, a modification example 2 of the embodiment will be described. The modification example 2 may be combined with other modification examples.

The modification example 2 is an example of a case where two or three lines 71 are included in the line pattern 70, the three lines 71 are not arranged at equal intervals and the printing coordinate on the coordinate axis X1 or X2 according to a part of the lines 71 is not an integer. Since the modification example 2 is similar to the embodiment in other respects, hereinafter, difference from the embodiment will be described.

FIG. 19 is a view showing an example of a test image used in the calculation processing of positional shift amount $G_i$ according to the modification example 2. Here, there is shown a test image used in the calculation processing of positional shift amount $G_A$ for the alignment element A. The test image in FIG. 19 is printed by the print heads 51K(2) and 51C(2) in the same positional relationship as FIG. 5.

The line pattern 70A of FIG. 19 is formed of two lines 71A having the printing coordinates on the coordinate axis X1 of (−1.5) and 2.4. The line pattern 70B is formed of three lines 71B having the printing coordinates on the coordinate axis X2 of (−3.0), 0.8 and 3.5. The unit coordinate intervals of the coordinate axes X1 and X2 are respectively 8s and 9s similarly to the embodiment.

Figure 20:
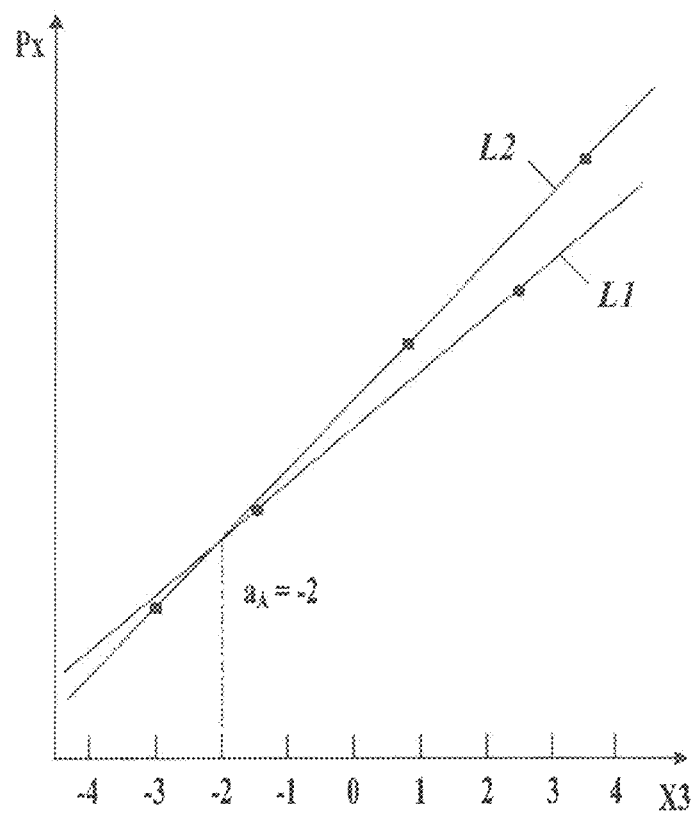
FIG. 20 This is a view for explaining straight lines showing correspondence relationships between printing coordinates and printing positions of a plurality of lines according to the modification example 2.

FIG. 20 is a view for explaining straight lines L1 and L2 indicating the correspondence relationships between the printing coordinates and the printing positions between the plurality of lines 71A and 71B according to the modification example 2.

In the modification example 2, though the line patterns 70A and 70B are formed of only two and three lines 71, respectively, since at least two lines 71 are included, it is possible to derive the straight lines L1 and L2 from the points corresponding to the lines 71.

The coordinate $a_A$ on the coordinate axis X3 of the intersection of the straight lines L1 and L2 in FIG. 20 is (−2), and the positional shift amount $g_A$ of the print head 51C(2) to the print head 51K(2) is calculated to 0.25 similarly to the embodiment, and the positional shift amount $G_A$ is calculated to the distance 2s.

In such a way, even when the lines 71 are not arranged at equal intervals and when the printing coordinates are not integers, it is possible to derive the straight lines L1 and L2 by acquiring the printing coordinate and the printing position of each of the lines 71. Further, the straight lines L1 and L2 can be derived if the line pattern 70 includes at least two lines 71. Accordingly, even in these cases, it is possible to calculate the positional shift $g_i$ and positional shift amount $G_i$ from the coordinate $a_i$ of the intersection of the straight lines L1 and L2.

Modification Example 3

Next, a modification example 3 of the embodiment will be described. The modification example 3 may be combined with other modification examples.

The modification example 3 is regarding an acquisition method of printing positions of lines 71 in a case where the lines 71 are inclined with respect to the Y axis in the image capturing data acquired as a result of image capturing caused by, for example, setting of the printing medium P inclined with respect to the conveyance direction at the time of capturing the test image with the line sensor 25. Since the modification example 3 is similar to the embodiment in other respects, hereinafter, difference from the embodiment will be described.

Figure 21:
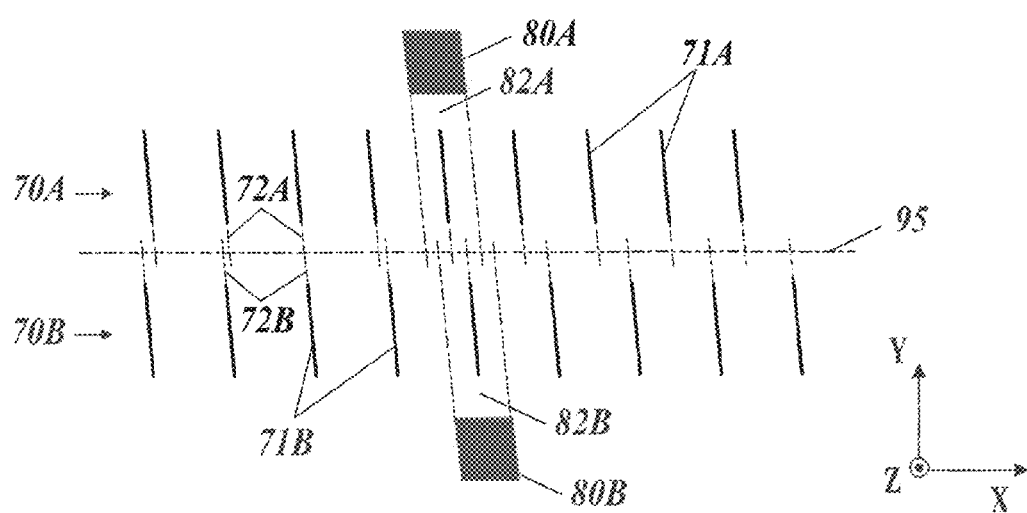
FIG. 21 This is a view for explaining processing in a case where lines are inclined with respect to a Y axis in image capturing data.

FIG. 21 is a view for explaining processing in a case where the lines 71 are inclined with respect to the Y axis in the image capturing data.

As shown in FIG. 21, in a case where the lines 71 which are to be parallel to the Y direction are inclined with respect to the Y axis, when the printing positions of lines 71 are acquired from the luminance data on the analysis line which was set in the X direction at the positions crossing the lines 71A and 71B, it is not possible to acquire the printing positions accurately reflecting the positional relationships between the lines 71A and 71B in a state of being printed on the printing medium P. Thus, the CPU 41 sets a single analysis line 95 (printing position acquisition line) in the X direction and acquires, as the printing positions, the positions in the X direction of the intersections of virtual lines 72A and 72B extending the respective lines 71 and the analysis line 95. Also for the reference marks 80A and 80B, positions in the X direction of the reference positions of reference marks 80A and 80B are acquired on the basis of the ranges in the X direction of the overlapping portions of virtual reference marks 82A and 82B extending the reference marks 80A and 80B and the analysis line 95.

In the modification example 3, in step S12 of the positional shift amount calculation processing shown in FIG. 15, the range necessary for the above extending processing of the lines 71A and 71B and the reference marks 80A and 80B is captured with the line sensor 25.

Though FIG. 21 describes an example of setting the analysis line 95 parallel to the X direction, in a case where the lines 71A and 71B to be parallel to the X direction are inclined with respect to the X axis, the analysis line 95 may be set in the Y direction to acquire, as the printing positions, the positions in the Y direction of the intersections of virtual lines 72A and 72B extending the respective lines 71A and 71B and the analysis line 95.

In such a way, the CPU 41 sets the analysis line 95 indicating the positions to acquire the printing positions in the direction parallel to the coordinate axis X1 (Y1), and acquires, as the printing positions, the positions in the X direction (Y direction) of the intersections of the virtual lines 72A and 72B extending the respective plurality of lines 71A and 71B and the analysis line 95. Thus, even in a case where the lines 71 are inclined with respect to the X axis (Y axis) in the image capturing data, it is possible to acquire the printing positions accurately reflecting the printing positions of the lines 71A and 71B in a state of being printed on the printing medium P.

The present invention is not limited to the embodiment and the modification examples, and various changes can be made.

For example, in the embodiment and the modification examples except for the modification example 2, description is made for an example in which the printing coordinates on the coordinate axes X1 (Y1) and X2 (Y2) of the lines 71A and 71B printed at equal intervals correspond to the numbers (line numbers) indicating the respective arrangement orders of the lines 71; however, the present invention is not limited to this. For example, the coordinate axes X1(Y1) and X2(Y2) may be set so that the printing coordinates on the coordinate axes X1 (Y1) and X2(Y2) of the lines 71A and 71B each printed at equal intervals are in arithmetic progression with a common difference of a predetermined value as in 0, ±2, ±4 and ±6. Not limited to this example, the positional shift amount $G_i$ of the print head 51 can be obtained by multiplying the positional shift $g_i$ having a unit of the unit coordinate interval of the coordinate axis X1(Y1) calculated by the above algorithm by the distance corresponding to the unit coordinate interval regardless of the way to set the unit coordinate intervals of the coordinate axes X1(Y1) and X2(Y2).

In the embodiment and the modification examples, description is made for an example in which the positional shift amount $G_i$ is calculated from the positional shift $g_i$, and correction of image data and correction of printing timing are performed on the basis of the positional shift amount $G_i$; however, the present invention is not limited to this, and the correction of image data and correction of ink ejection timing may be performed on the basis of the positional shift $g_i$ or a value which is acquired by performing predetermined conversion processing to the positional shift $g_i$.

In the embodiment and the modification examples, the positional shift $g_i$ is calculated as a value with a unit of the unit coordinate interval of the coordinate axis X1 (Y1); however, the present invention is not limited to this, and calculation may be performed with, as a unit, a value which is predetermined times the unit coordinate interval. For example, in the embodiment, the positional shift $g_i$ may be calculated with a unit of the value which is one eighth of the unit coordinate interval of the coordinate axis X1 (Y1), and in this case, the positional shift amount $G_i$ can be calculated by multiplying the positional shift $g_i$ by the distance s corresponding to the unit. This example corresponds to calculation of positional shift $g_i$ with the distance s as a unit, the distance s being the disposition interval of printing elements 52 and the interval of the printing pixels in the Y direction.

In the embodiment and the modification examples, description is made for an example in which the positional shift amount $G_i$ is obtained by reading the distance corresponding to the unit coordinate interval of the coordinate axis X1 (Y1) from the RAM 42 and multiplying the positional shift $g_i$ by the read distance; however, the present invention is not limited to this. For example, in a case where the resolution of the line sensor 25 is specified, the distance corresponding to the unit coordinate interval of the coordinate axis X1 (Y1) may be calculated from the image capturing data of the test image.

In the embodiment and the modification examples, description is made for an example in which the positional shift $g_i$ is calculated by the formula $g=(-(r_i-1)\times a_i)$ on the basis of the coordinate $a_i$ and the rate $r_i$; however, the present invention is not limited to this, and the positional shift $g_i$ may be calculated by using a parameter capable of deriving the rate $r_i$ instead of using the rate $r_i$. As the parameter capable of deriving the rate $r_i$ includes, for example, a pair of value d1 corresponding to the unit coordinate interval of the coordinate axis X1(Y1) and value d2 corresponding to the unit coordinate interval of the coordinate axis X2 (Y2). In this case, the positional shift $g_i$ can be calculated by the formula $g_i=(-(d2-d1)/d1\times a_i)$.

In the embodiment and the modification examples, description is made for an example in which the coordinate $a_i$ is calculated from the intersection of straight lines L1 and L2 in the orthogonal coordinate system having the two axes of coordinate axis X3 (Y3) and coordinate axis Px (Py); however, the present invention is not limited to this. For example, after acquisition of the printing coordinates and the printing position of the lines 71A and 71B, the coordinate $a_i$ may be directly acquired without deriving the straight lines L1 and L2. For example, in a case where the printing coordinates and the printing positions of one line 71A and one line 71B are both same, the value of the printing coordinate can be acquired without change as the value of coordinate $a_i$.

The coordinate $a_i$ may be directly acquired by visually obtaining the position where the coordinates on the coordinate axes X1(Y1) and X2(Y2) match on the image capturing data.

In the embodiment and the modification examples, the positive directions of the coordinate axes X1(Y1) and X2(Y2) match the positive direction of the X coordinate (X direction) (positive direction of the Y coordinate (Y direction)); however, the positive directions of the coordinate axes X1 (Y1) and X2 (Y2) may be changed according to a predetermined rule. For example, in a case where the interval of the lines 71A printed by the print head 51 as a reference is larger than the interval of the lines 71B printed by the print head 51 as the test target, the positive directions of the coordinate axes X1(Y1) and X2(Y2) may be −X direction (−Y direction). In this case, in order to make the sign of the calculated positional shift $g_i$ match the direction of positional shift on the X coordinate (Y coordinate), the positional shift $g_i$ may be obtained by the formula $g=((r_i-1) \times a_i)$ by multiplying the right-hand side of the above formula by −1.

In the embodiment and the modification examples, description is made for an example in which the interval of lines 71A printed by the print head 51 as a reference is the distance 8s, and the interval of lines 71B printed by the print head 51 as the test target is the distance 9s or 7s; however, the present invention is not limited to this, and the intervals of the lines 71 can be changed according to the assumed amount of the positional shift $g_i$ or the like. In this case, the interval of line 71 can be arbitrarily set within a range that the interval is twice or more the above-mentioned width direction luminance transition distance dx or the conveyance direction luminance transition distance dy, adjacent lines 71 can be separated and read from the image capturing data by the line sensor 25, and the number of lines 71 corresponding to the points for deriving the straight lines L1 and L2 is a predetermined number or more.

In the embodiment and the modification examples, description is made for an example in which the reference marks 80 are rectangular; however, the present invention is not limited to this, and each of the reference marks 80 can be in an arbitrary shape as long as the length in the coordinate axis X1 (Y1) is larger than the length in the coordinate axis X1 (Y1) direction of each of the plurality of lines 71 and smaller than the printing width in the coordinate axis X1 (Y1) direction of the line pattern 70.

The positions to print the reference marks 80 are not limited to the manners of the embodiment and the modification examples, and can be arbitrary positions on the printing medium P. For example, the reference marks 80 may be printed so that the reference positions are located other than the original points of the coordinate axes X1(Y1) and X2(Y2).

In the embodiment and the modification examples, description is made for an example in which the printing coordinates of lines 71 corresponding to the original points of coordinate axes X1(Y1) and X2(Y2) are specified from a positional relationship with the reference marks 80; however, the present invention is not limited to this. For example, in a case where the plurality of lines 71A and 71B are respectively printed at predetermined intervals, the CPU 41 may acquire the printing coordinates of the plurality of lines 71A from the predetermined interval and the respective values corresponding to the numbers indicating the arrangement orders of the plurality of lines 71A, and acquire printing coordinates of the plurality of lines 71B from the predetermined interval and the respective values corresponding to the numbers indicating the arrangement orders of the plurality of lines 711B. Thus, it is possible to acquire the printing coordinates of lines 71 and perform positional shift amount calculation processing without printing the reference marks 80.

In the embodiment and the modification examples, description is made for an example in which the printing coordinates of lines 71 corresponding to the original points of coordinate axes X1(Y1) and X2(Y2) are specified from positional relationships with the reference marks 80 and the printing coordinates of the other plurality of lines 71 are specified from the arrangement orders of the plurality of lines 71; however, the present invention is not limited to this, and the relative positions of respective lines 71 from the reference marks 80 and the printing coordinates of the lines 71 may be stored in the RAM 42 in advance.

In the embodiment and the modification examples, description is made for an example in which the lines 71A and 72B parallel to the Y direction are printed by a single printing element 52 of the print head 51; however, the present invention is not limited to this, and the lines 71A and 71B may be printed by a plurality of printing elements 52 in a positional relationship not separating the ink ejected to the printing medium P in the X direction. Thus, the lines 71A and 71B can be printed even when the printing elements 52 to print the lines 71A and 71B include a printing element 52 having ejection defect.

In the embodiment and the modification examples, description is made for an example in which the positional shift $g_i$ and the positional shift amount $G_i$ of each of the print heads 51K is calculated with respect to the print head 51K(2) as a reference; however, the positional shift $g_i$ and the positional shift amount $G_i$ may be calculated with respect to a print head 51 other than the print head 51K(2) as a reference.

In the embodiment and the modification examples, description is made for an example in which the test image printed by the inkjet printing apparatus 1 is captured and read by the line sensor 25 included in the inkjet printing apparatus 1; however, the present invention is not limited to this. For example, the test image printed on the printing medium P by the inkjet printing apparatus 1 may be captured and read by an image capturing section included in a reading apparatus which is separate from the inkjet printing apparatus 1. In this case, the processing of calculating the positional shift $g_i$ and the positional shift amount $G_i$ from the image capturing data and the processing of correcting the image data by using the positional shift $g_i$ and the positional shift amount $G_i$ may be executed in an image processing apparatus outside the inkjet printing apparatus 1, and the processing results may be input to the inkjet printing apparatus 1 or the processing may be performed in the inkjet printing apparatus 1.

In the embodiment and the modification examples, description is made for an example in which the line sensor 25 is used as an image capturing section; however, the present invention is not limited to this, and for example, a two-dimensional image sensor or the like may be used.

The description is made that the line sensor 25 is disposed along the direction (X direction) orthogonal to the conveyance direction of the printing medium P; however, the present invention is not limited to this. The line sensor 25 is sufficient as long as image capturing is performed along a predetermined straight line crossing the conveyance direction, and the line sensor 25 can have an arbitrary angle as long as the angle from the X direction of the line sensor 25 is known.

In the embodiment and the modification examples, description is made for an example in which the conveyance drum 21 is used as the conveyance section; however, the present invention is not limited to this, and there can be used an arbitrary conveyance section which holds and conveys a printing medium P on the conveyance surface. For example, there may be used a conveyance section which has a belt supported by two rollers and rotating around the two rollers according to rotation of the rollers and holds the printing medium P on the conveyance surface of the belt.

In the embodiment and the modification examples, description is made for an example in which the inkjet printing apparatus 1 is used as the image printing apparatus; however, the present invention can be applied to various image printing apparatuses which print images by using a plurality of printing elements. For example, the present invention may be applied to an image printing apparatus of an electrophotographic system which emits light from print heads having arranged LEDs (Light Emitting Diodes) or laser light emitting elements as printing elements to a charged photoconductive drum to form electrostatic latent images, and, according to the electrostatic latent images, transfers the toner distributed on the photoconductive drum onto the printing medium to form an image.

Though several embodiments of the present invention have been described, the scope of the present invention is not limited to the above-mentioned embodiments, and includes the scope of inventions, which is described in the scope of claims, and the scope equivalent thereof.

INDUSTRIAL APPLICABILITY

The present invention is applicable in an information processing device, an image printing apparatus and an information processing method.

EXPLANATION OF REFERENCE NUMERALS 1 inkjet printing apparatus
2 external apparatus
10 sheet feeding section
11 sheet feeding tray
12 conveyance section
121, 122 roller
123 belt
20 image printing section
21 conveyance drum
21M conveyance drum motor
22 passing unit
221 swing arm section
222 drum
23 heating section
24 fixing section
25 line sensor
251 image capturing element
252 pixel
26 delivery section
261, 262 roller
263 belt
264 drum
30 sheet ejection section
31 sheet ejection tray
40 control section
41 CPU
42 RAM
43 ROM
44 storage section
50 head unit
51 print head
52 printing element
61 print head control circuit
62 line sensor control circuit
63 conveyance drum motor control circuit
64 interface
65 bus
70A, 70B line pattern
71A, 71B line
72A, 72B virtual line
80A, 80B reference mark
91, 95 analysis line
92ax, 92ay first tone image region
92bx, 92by second tone image region
93cx width direction luminance transition range
93cy conveyance direction luminance transition range
dx width direction luminance transition distance
dy conveyance direction luminance transition distance
g, $g_A$, $g_B$, $g_C$ and $g_D$ positional shift
G, $G_A$, $G_B$, $G_C$ and $G_D$ positional shift amount
P printing medium

The invention claimed is:

1. An information processing device which performs processing of specifying a positional relationship between a first printing section and a second printing section based on image capturing data of a test image that is printed on a printing medium by the first printing section and the second printing section in each of which a plurality of printing elements are arranged, the test image including a plurality of first lines which are printed by the first printing section so as to have printing positions different from each other in a line arrangement direction on the printing medium and a plurality of second lines which are printed by the second printing section so as to have printing positions different from each other in the line arrangement direction, and the information processing device comprising:

a printing coordinate acquisition section which acquires a printing coordinate on a first coordinate axis on the printing medium for each of the plurality of first lines and acquires a printing coordinate on a second coordinate axis for each of the plurality of second lines, the first coordinate axis being an axis in which a predetermined first unit coordinate interval is determined in the line arrangement direction, and the second coordinate axis being an axis in which a second unit coordinate interval different from the first unit coordinate interval is determined in the line arrangement direction and a reference position when the first printing section and the second printing section are disposed in a specific positional relationship in the line arrangement direction is in a predetermined reference relative positional relationship in the line arrangement direction with a reference position of the first coordinate axis;

a printing position acquisition section which acquires a printing position in the line arrangement direction of each of the plurality of first lines and the plurality of second lines in the image capturing data; and a positional shift amount calculation section which specifies a relative positional relationship in the line arrangement direction between the reference position of the first coordinate axis and the reference position of the second coordinate axis from a correspondence relationship between the printing coordinate and the printing position that are acquired, and calculates a value corresponding to a positional shift amount from the specific positional relationship in the line arrangement direction of the second printing section with respect to the first printing section based on the specified relative positional relationship and the predetermined reference relative positional relationship.

2. The information processing device according to claim 1, wherein
the predetermined reference relative positional relationship is a positional relationship in which positions in the line arrangement direction of the reference position of the first coordinate axis and the reference position of the second coordinate axis match, and
the positional shift amount calculation section specifies a relative positional relationship in the line arrangement direction between the first coordinate axis and the second coordinate axis based on a same coordinate at a position in the line arrangement direction where the first coordinate axis and the second coordinate axis have the same coordinate.

3. The information processing device according to claim 2, wherein, in a orthogonal coordinate system which has two axes of a third coordinate axis indicating the printing coordinates on the first coordinate axis and on the second coordinate axis with a common coordinate axis and a fourth coordinate axis indicating the printing positions, the positional shift amount calculation section calculates a first approximate straight line of a plurality of points respectively corresponding to combinations of the printing coordinates and the printing positions of the plurality of first lines and a second approximate straight line of a plurality of points respectively corresponding to combinations of the printing coordinates and the printing positions of the plurality of second lines, and acquires the same coordinate from a coordinate on the third coordinate axis of an intersection of the first approximate straight line and the second approximate straight line.

4. The information processing device according to claim 1, wherein
the test image includes a first identification mark which is printed in a predetermined positional relationship with the plurality of first lines by the first printing section and a second identification mark which is printed in a predetermined positional relationship with the plurality of second lines by the second printing section, and
the printing coordinate acquisition section acquires the printing coordinate on the first coordinate axis of at least one of the plurality of first lines based on a positional relationship in the line arrangement direction with the first identification mark, and acquires the printing coordinate on the second coordinate axis of at least one of the plurality of second lines based on a positional relationship in the line arrangement direction with the second identification mark.

5. The information processing device according to claim 1, wherein
each of the plurality of first lines and the plurality of second lines is printed at a predetermined interval, and
the printing coordinate acquisition section acquires the printing coordinates of the plurality of first lines from the predetermined interval and values corresponding to numbers indicating arrangement orders of the plurality of first lines, and acquires the printing coordinates of the plurality of second lines from the predetermined interval and values corresponding to numbers indicating arrangement orders of the plurality of second lines.

6. The information processing device according to claim 1, wherein each of the plurality of first lines and the plurality of second lines is three lines or more which are printed at an equal interval.

7. The information processing device according to claim 6, wherein the printing coordinate acquisition section acquires values corresponding to numbers indicating arrangement orders of the plurality of first lines as the printing coordinates of the plurality of first lines, and acquires values corresponding to numbers indicating arrangement orders of the plurality of second lines as the printing coordinates of the plurality of second lines.

8. The information processing device according to claim 1, wherein the printing coordinate acquisition section sets a printing coordinate of one of the plurality of first lines to the reference position of the first coordinate axis and sets a printing coordinate of one of the plurality of second lines to the reference position of the second coordinate axis.

9. The information processing device according to claim 1, wherein
the test image is formed by printing the plurality of first lines with printing elements disposed at positions which are different in a width direction orthogonal to a conveyance direction among the plurality of printing elements of the first printing section and printing the plurality of second lines with printing elements disposed at positions which are different in the width direction among the plurality of printing elements of the second printing section while the printing medium is moved with respect to the first printing section and the second printing section by a conveyance section which moves the printing medium in the conveyance direction, and
the positional shift amount calculation section calculates a value corresponding to a positional shift amount in the width direction of the second printing section with respect to the first printing section as the value corresponding to the positional shift amount from the specific positional relationship.

10. The information processing device according to claim 1, wherein
the test image is formed by printing the plurality of first lines with printing elements which are in a positional relationship of printing a continuous line among the plurality of printing elements of the first printing section and printing the plurality of second lines with printing elements which are in a positional relationship of printing a continuous line among the plurality of printing elements of the second printing section while the printing medium is moved with respect to the first printing section and the second printing section by a conveyance section which moves the printing medium in a conveyance direction, and
the positional shift amount calculation section calculates a value corresponding to a positional shift amount in the conveyance direction of the second printing section with respect to the first printing section as the value corresponding to the positional shift amount from the specific positional relationship.

11. The information processing device according to claim 1, wherein the printing position acquisition section sets a printing position acquisition line indicating a position to acquire the printing position in the line arrangement direction, and acquires, as the printing position, a position in the line arrangement direction of an intersection of a virtual line obtained by extending each of the plurality of first lines and the plurality of second lines and the printing position acquisition line.

12. The information processing device according to claim 1, further comprising an image data correction section which corrects image data of an image printed on the printing medium by the first printing section and the second printing section based on the value corresponding to the positional shift amount calculated by the positional shift amount calculation section or the positional shift amount.

13. An image printing apparatus, comprising:
the information processing device according to claim 1, and
the first printing section and the second printing section.

14. An image printing apparatus, comprising:
the information processing device according to claim 9;
the first printing section and the second printing section; and
a printing timing correction section which corrects a timing when printing is performed on the printing medium by each of the first printing section and the second printing section based on the value corresponding to the positional shift amount calculated by the positional shift amount calculation section or the positional shift amount.

15. An image printing apparatus, comprising:
the information processing device according to claim 9;
the first printing section and the second printing section; and
a printing control section which, when a luminance transition range of changing a luminance between luminances of two uniform tone image regions is generated in image capturing data obtained by capturing the two uniform tone image regions with an image capturing section that captures the test image, the two uniform tone image regions being adjacent in the width direction and having different luminances, controls the first printing section to print the plurality of first lines so that an interval in the width direction of adjacent plurality of first lines is twice or more a distance on the printing medium corresponding to a length in the width direction of the luminance transition range, and controls the second printing section to print the plurality of second lines so that an interval in the width direction of adjacent plurality of second lines is twice or more the distance on the printing medium corresponding to the length in the width direction of the luminance transition range.

16. An image printing apparatus, comprising:
the information processing device according to claim 10;
the first printing section and the second printing section; and
a printing control section which, when a luminance transition range of changing a luminance between luminances of two uniform tone image regions is generated in image capturing data obtained by capturing the two uniform tone image regions with an image capturing section that captures the test image, the two uniform tone image regions being adjacent in the conveyance direction and having different luminances, controls the first printing section to print the plurality of first lines so that an interval in the conveyance direction of adjacent plurality of first lines is twice or more a distance on the printing medium corresponding to a length in the conveyance direction of the luminance transition range, and controls the second printing section to print the plurality of second lines so that an interval in the conveyance direction of adjacent plurality of second lines is twice or more the distance on the printing medium corresponding to the length in the conveyance direction of the luminance transition range.

17. An image printing apparatus, comprising:
the information processing device according to claim 9;
the first printing section and the second printing section;
the conveyance section;
an image capturing section which captures the test image printed on the printing medium by a plurality of image capturing elements that are arranged in the width direction over a printing range of the test image on the printing medium, and outputs the image capturing data; and
a printing control section which controls the first printing section to print the plurality of first lines and controls the second printing section to print the plurality of second lines so that an interval of adjacent lines is three times or more and less than 30 times a disposition interval in the width direction of the plurality of image capturing elements.

18. An information processing method for performing processing of specifying a positional relationship between a first printing section and a second printing section based on image capturing data of a test image that is printed on a printing medium by the first printing section and the second printing section in each of which a plurality of printing elements are arranged, the test image including a plurality of first lines which are printed by the first printing section so as to have printing positions different from each other in a line arrangement direction on the printing medium and a plurality of second lines which are printed by the second printing section so as to have printing positions different from each other in the line arrangement direction, and the information processing method comprising:
a printing coordinate acquisition step of acquiring a printing coordinate on a first coordinate axis on the printing medium for each of the plurality of first lines and acquiring a printing coordinate on a second coordinate axis for each of the plurality of second lines, the first coordinate axis being an axis in which a predetermined first unit coordinate interval is determined in the line arrangement direction, and the second coordinate axis being an axis in which a second unit coordinate interval different from the first unit coordinate interval is determined in the line arrangement direction and a reference position when the first printing section and the second printing section are disposed in a specific positional relationship in the line arrangement direction is in a predetermined reference relative positional relationship in the line arrangement direction with a reference position of the first coordinate axis;
a printing position acquisition step of acquiring a printing position in the line arrangement direction of each of the plurality of first lines and the plurality of second lines in the image capturing data; and
a positional shift amount calculation step of specifying a relative positional relationship in the line arrangement direction between the reference position of the first coordinate axis and the reference position of the second coordinate axis from a correspondence relationship between the printing coordinate and the printing position that are acquired, and calculating a value corresponding to a positional shift amount from the specific positional relationship in the line arrangement direction of the second printing section with respect to the first printing section based on the specified relative positional relationship and the predetermined reference relative positional relationship.

* * * * *